US010412266B2

(12) United States Patent
Kakutani et al.

(10) Patent No.: US 10,412,266 B2
(45) Date of Patent: Sep. 10, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventors: Naoya Kakutani, Kashiwa (JP); Toru Wakana, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/257,526

(22) Filed: Sep. 6, 2016

(65) Prior Publication Data
US 2017/0085751 A1 Mar. 23, 2017

(30) Foreign Application Priority Data

Sep. 18, 2015 (JP) .................................. 2015-185515
Jan. 19, 2016 (JP) .................................. 2016-008289

(51) Int. Cl.
*G06F 3/12* (2006.01)
*H04N 1/32* (2006.01)
(Continued)

(52) U.S. Cl.
CPC ......... *H04N 1/4413* (2013.01); *G06F 3/1222* (2013.01); *G06F 3/1236* (2013.01); *G06F 3/1238* (2013.01); *G06F 3/1292* (2013.01); *H04L 63/083* (2013.01); *H04N 1/32272* (2013.01); *H04N 1/32776* (2013.01);
(Continued)

(58) Field of Classification Search
None
See application file for complete search history.

(56) References Cited

U.S. PATENT DOCUMENTS 8,719,952 B1\* 5/2014 Damm-Goossens ........................ H04L 9/0825 380/285
8,842,314 B2 9/2014 Takeuchi et al. ............ 358/1.15
(Continued)

FOREIGN PATENT DOCUMENTS

CN 103428000 12/2013
JP 2014-230178 12/2014
WO WO-2014181884 A1 \* 11/2014 ........... H04N 1/0023

OTHER PUBLICATIONS

Bluetooth Sig (Usability Expert Group): "Bluetooth User Interface Flow Diagrams for Bluetooth Secure Simple Pairing Devices", Internet Citation, Sep. 13, 2007 (Sep. 13, 2007), pp. 1-54, XP002668327, retrieved from URL: https://www.bluetooth.org/technical/specifications/whitepapers.htm [retrieved on Jan. 23, 2012].
(Continued)

*Primary Examiner* — Beniyam Menberu
(74) *Attorney, Agent, or Firm* — Venable LLP

(57) ABSTRACT

When this image processing apparatus accepts an initial connection request from a mobile terminal, it displays a generated PIN code on a console unit 210, and when it accepts information corresponding to the PIN code from the mobile terminal, it compares that information with the generated PIN code, and performs authentication. When the authentication is successful, it generates a public key and a private key, and transmits the generated public key to the mobile terminal.

17 Claims, 25 Drawing Sheets

(51) Int. Cl.
*H04N 1/44* (2006.01)
*H04W 12/04* (2009.01)
*H04W 12/06* (2009.01)
*H04W 4/80* (2018.01)
*G06K 15/02* (2006.01)
*H04N 1/327* (2006.01)
*H04L 29/06* (2006.01)
*H04W 84/18* (2009.01)

(52) U.S. Cl.
CPC ............ *H04N 1/4433* (2013.01); *H04W 4/80* (2018.02); *H04W 12/04* (2013.01); *H04L 63/061* (2013.01); *H04L 63/0823* (2013.01); *H04N 2201/0094* (2013.01); *H04W 12/06* (2013.01); *H04W 84/18* (2013.01)

(56) References Cited

U.S. PATENT DOCUMENTS

| | | | | |
|---|---|---|---|---|
| 2003/0046560 A1* | 3/2003 | Inomata | ............... | G06F 21/606 713/189 |
| 2003/0217270 A1* | 11/2003 | Nakayama | ............. | G06F 21/31 713/172 |
| 2004/0161277 A1* | 8/2004 | Gassho | ................ | G06F 21/608 400/76 |
| 2004/0203384 A1* | 10/2004 | Sugikawa | ............ | H04W 12/06 455/41.2 |
| 2005/0152543 A1* | 7/2005 | Shima | .................. | G06F 21/608 380/51 |
| 2007/0201389 A1* | 8/2007 | Murayama | ........... | H04W 76/11 370/310 |
| 2009/0316206 A1* | 12/2009 | Anezaki | ............ | H04N 1/32619 358/1.15 |
| 2010/0058064 A1* | 3/2010 | Kirovski | .............. | H04L 9/3073 713/176 |
| 2010/0319055 A1* | 12/2010 | Tamura | ................ | H04L 63/105 726/4 |
| 2010/0332833 A1 | 12/2010 | Aissi et al. | .................... | 713/169 |
| 2011/0081860 A1* | 4/2011 | Brown | ............... | H04N 1/00347 455/41.3 |
| 2012/0099025 A1* | 4/2012 | Kanda | ................ | H04L 12/2827 348/734 |
| 2012/0265887 A1* | 10/2012 | Goto | ..................... | H04W 76/10 709/228 |
| 2012/0284195 A1* | 11/2012 | McMillen | .......... | G06Q 20/3223 705/71 |
| 2012/0322391 A1* | 12/2012 | Suzuki | ................. | H04W 12/06 455/68 |
| 2013/0148158 A1* | 6/2013 | Kanakubo | ............. | G06F 3/1292 358/1.15 |
| 2013/0170482 A1* | 7/2013 | Jung | .................... | H04W 8/005 370/338 |
| 2014/0092421 A1* | 4/2014 | Shibata | ............. | H04N 1/00233 358/1.14 |
| 2014/0254581 A1* | 9/2014 | Ogawara | ............... | H04W 76/14 370/343 |
| 2014/0308898 A1* | 10/2014 | Lee | ....................... | H04W 76/14 455/41.3 |
| 2015/0055779 A1* | 2/2015 | Enomoto | ............... | G08C 17/00 380/270 |
| 2015/0351006 A1* | 12/2015 | Lim | ...................... | H04W 48/14 370/329 |
| 2016/0021192 A1* | 1/2016 | Passichenko | ....... | H04L 63/0428 713/168 |
| 2016/0066184 A1* | 3/2016 | Bhargav-Spantzel | ...................... | G06F 21/40 726/7 |

OTHER PUBLICATIONS

Ming Ki Chong et al: "A Survey of User Interaction for Spontaneous Device Association", ACM Computing Surveys, ACM, New York, NY, vol. 47, No. 1, May 1, 2014 (May 1, 2014), pp. 1-40, XP058049794, ISSN: 0360-0300, doi:10.1145/2597768.
Extended European Search Report dated Dec. 13, 2016 in counterpart European Application No. 16186240.4.
CN Office Action dated Jul. 3, 2019 in counterpart CN Application No. 201610825909.X with English translation.

* cited by examiner

F I G. 5A
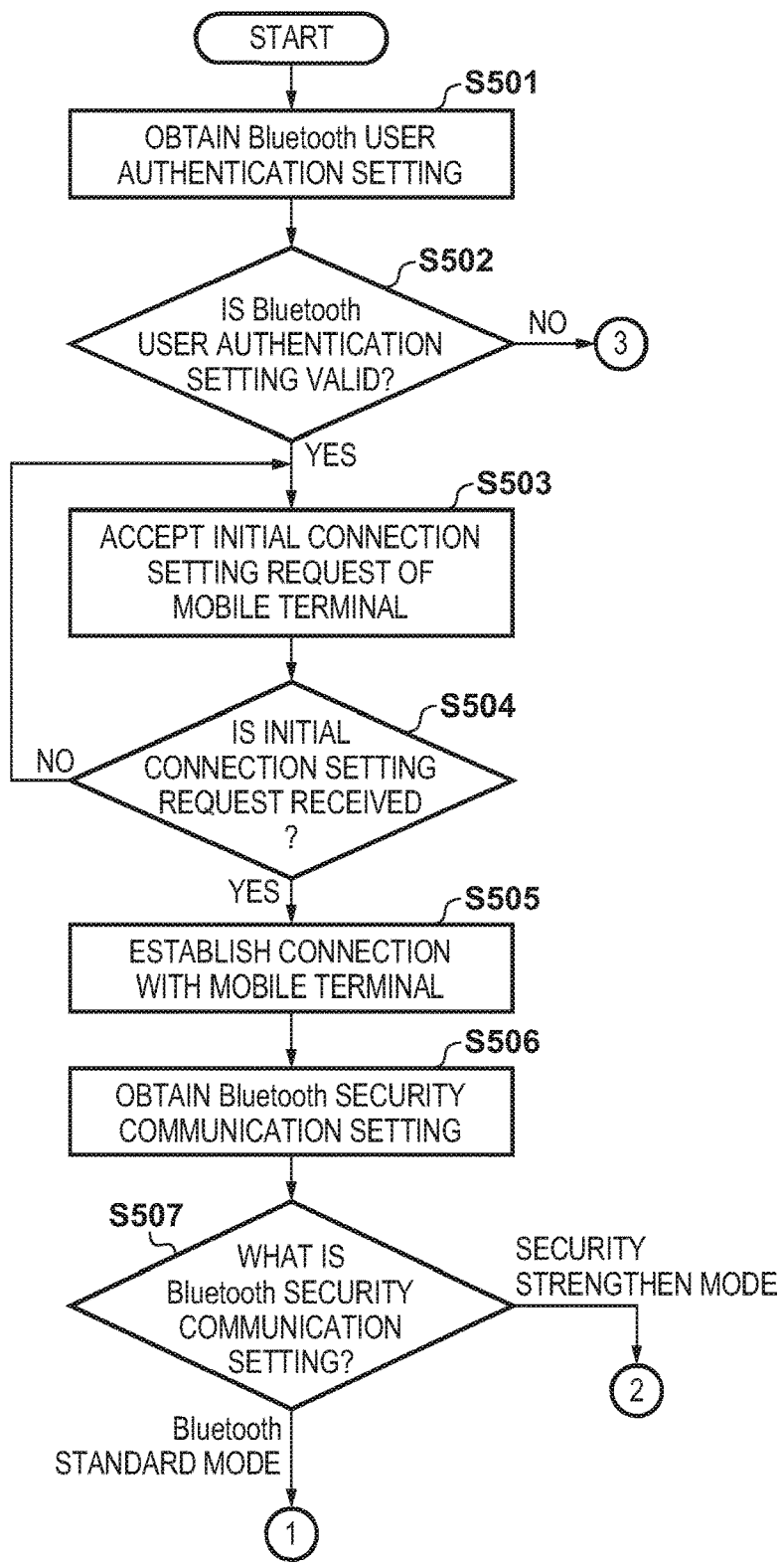

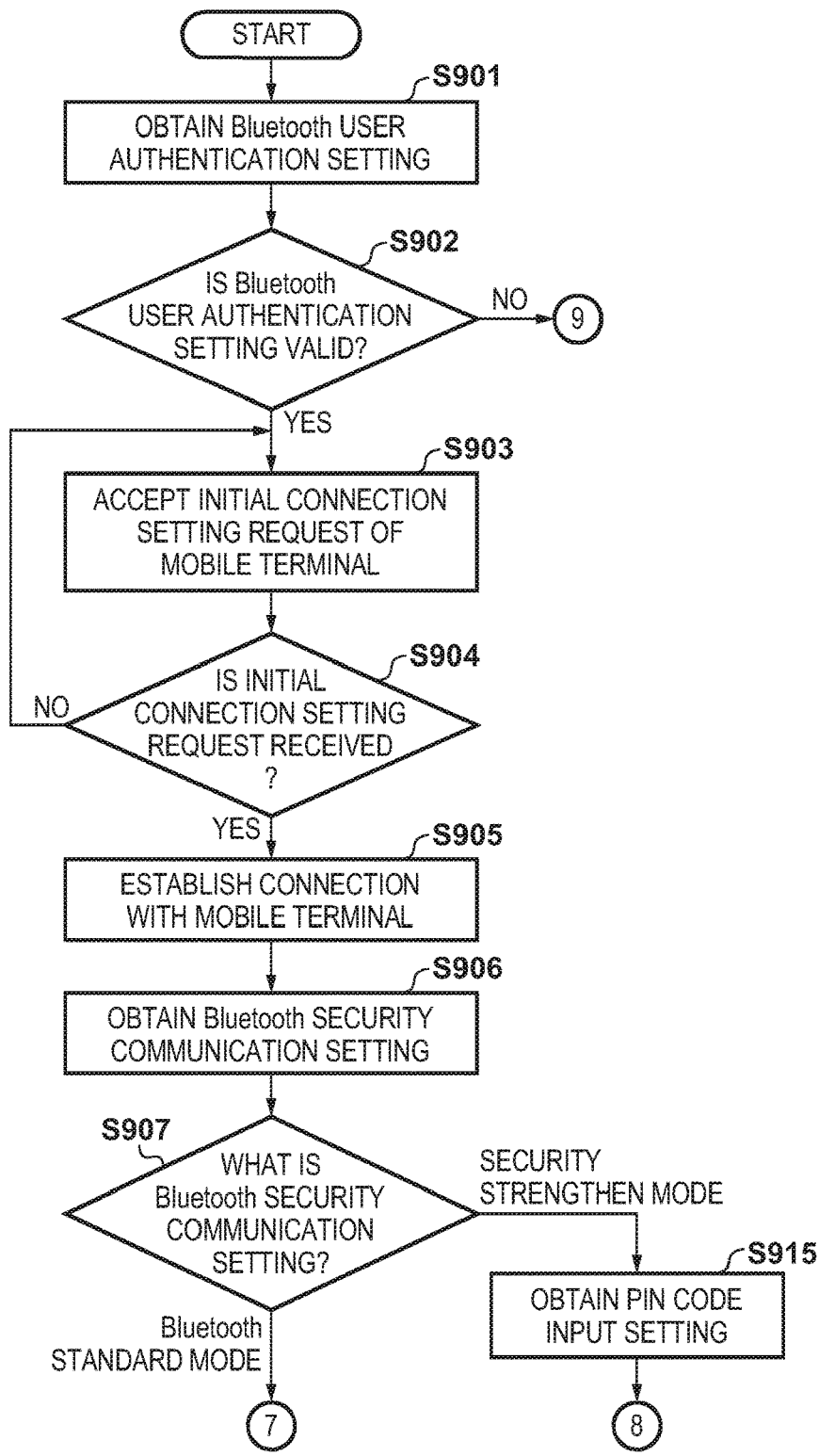

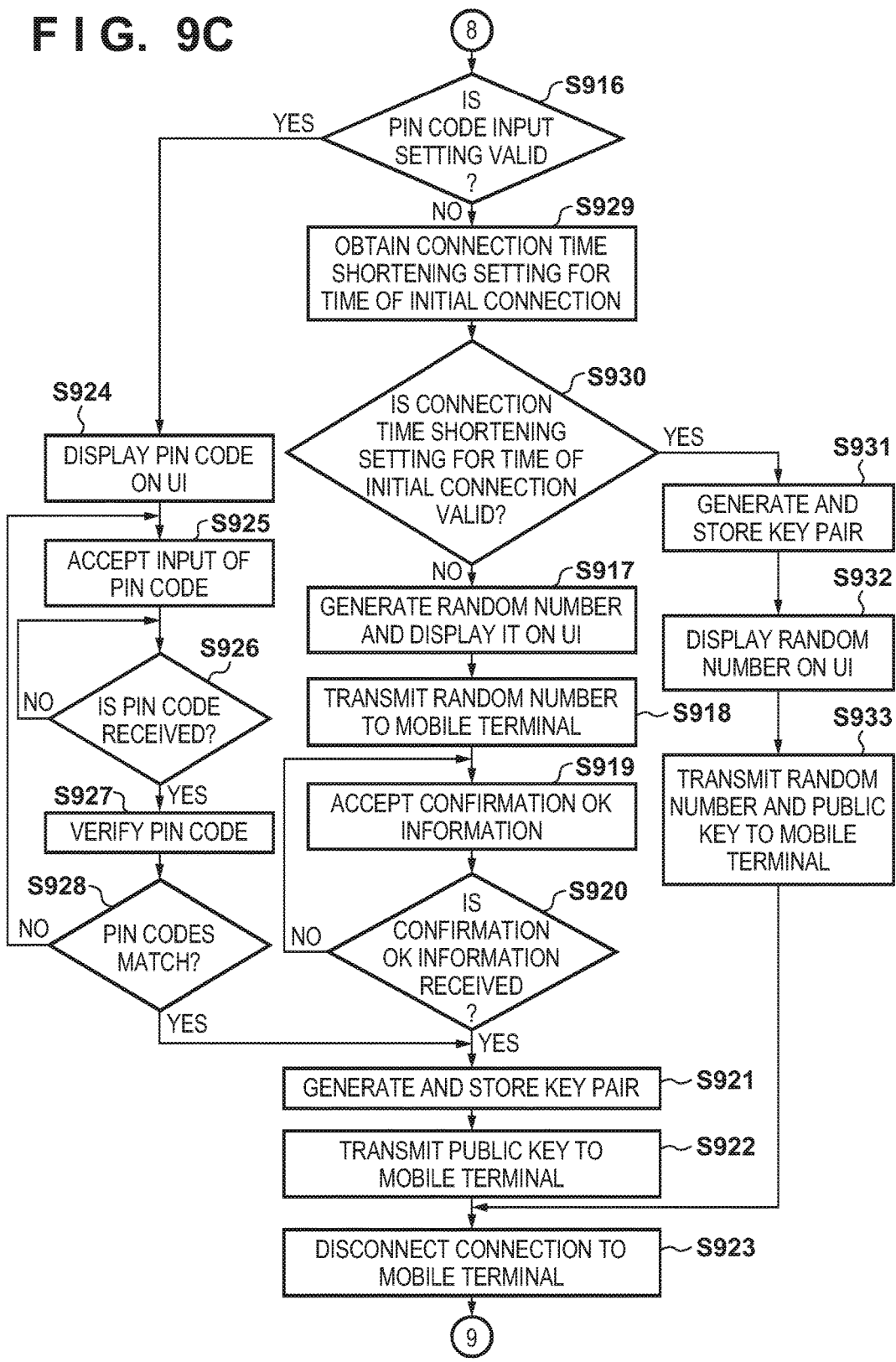

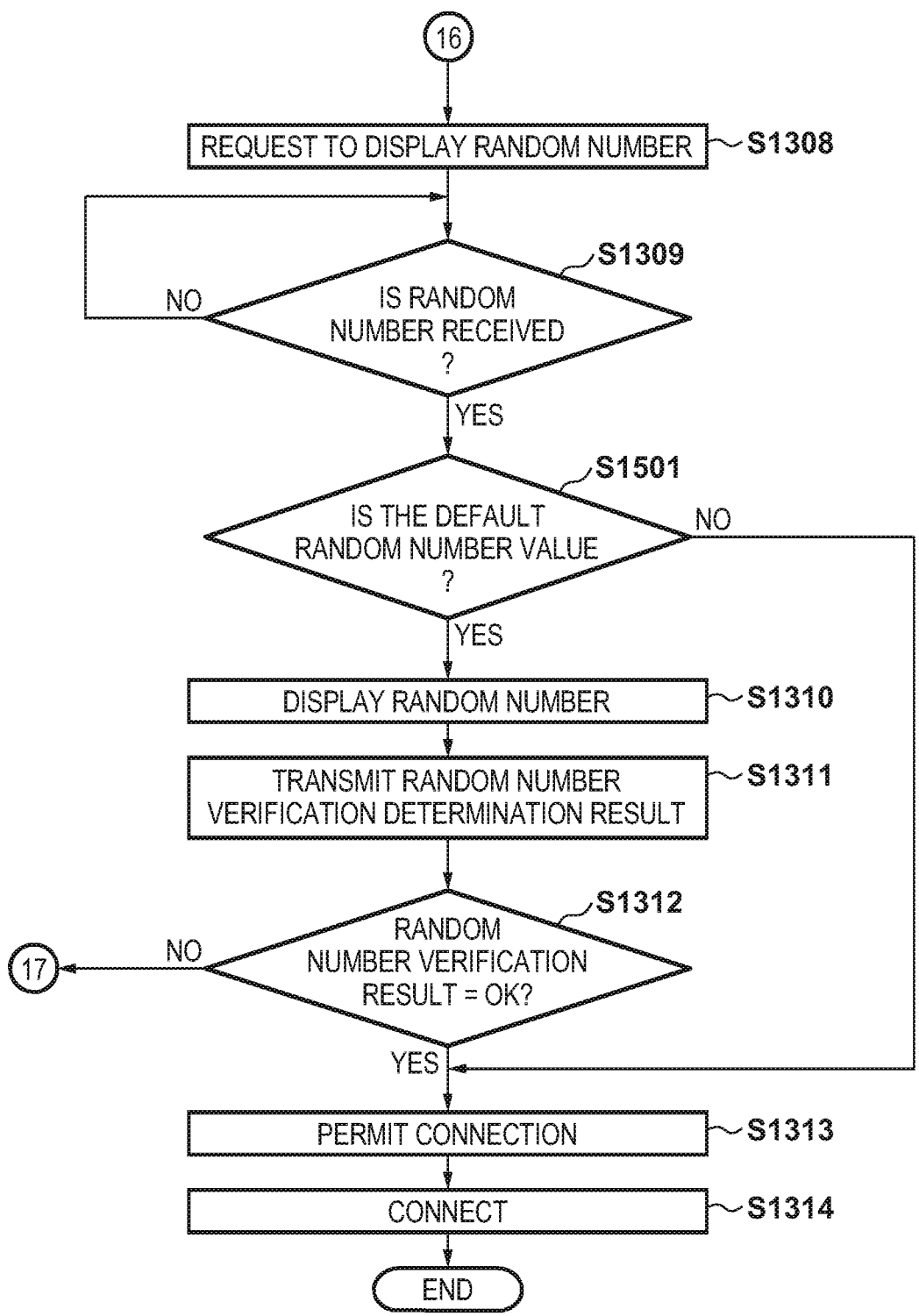
F I G. 15B

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus capable of being connected to from a mobile terminal, a method of controlling the same, and a storage medium.

Description of the Related Art

In recent years, a function for cooperating with a mobile terminal is provided in a multifunction peripheral which is one type of information communication process apparatus which includes various wireless communication functions. For example, a multifunction peripheral or the like equipped with wireless LAN, Bluetooth (registered trademark), or the like is known. In Japanese Patent Application No. 2014-230178, a technique for performing control of printing of a multifunction peripheral from a mobile terminal using Bluetooth is proposed.

As the multifunction peripheral, in addition to print control via Bluetooth, a user authentication function via a communication via Bluetooth from the mobile terminal is also considered. In such a case, it is necessary that the mobile terminal transmit confidential information such as a user ID and a password to the multifunction peripheral. An input range of the password is generally an English text code and eight characters or more. A path-encrypted communication between the mobile terminal and the multifunction peripheral for handling the confidential information in a communication path must be performed.

Conventionally, when performing a path-encrypted communication using Bluetooth, a device which receives a connection displays a PIN code, a device which requests the connection inputs the PIN code, key exchange is performed if there is a match, and encryption is implemented by those keys. The PIN code that is handled by Bluetooth is a six digit number.

However, there exists a problem in the conventional technique described above which is described below. Although the PIN code that is handled by Bluetooth is a six digit number, the input area of the password is generally set in a larger range. For this reason, when a brute force attack or the like is performed at a time of the PIN code input, there is a security threat in that password information will be obtained. Normally, if path-encryption is performed, a method in which an LTK (Long Term Key) is exchanged with the mobile terminal after PIN code verification is used. However, because it cannot be determined whether or not the mobile terminal obtained the LTK from the correct multifunction peripheral, there is a security threat of a malicious third party spoofing the multifunction peripheral, and obtaining the user ID and password sent from the mobile terminal side. Accordingly, it is necessary to realize user authentication information path-encryption by performing encryption from a correct, non-spoofed multifunction peripheral while maintaining higher complexity and cryptographic intensity than with a PIN code.

SUMMARY OF THE INVENTION

The present invention enables realization of an arrangement in which, when user authentication is performed in relation to an image processing apparatus from a mobile terminal, a high security path-encrypted communication is performed while preventing spoofing of the image processing apparatus.

One aspect of the present invention provides an image processing apparatus with which an external terminal can communicate, the apparatus comprising: an accepting unit configured to accept a connection request from the external terminal; a generation unit configured to generate an identifier of a first number of digits that is assigned to the external terminal when an initial connection request is accepted by the accepting unit; a display unit configured to display the identifier generated by the generation unit; and a control unit configured to, when information corresponding to the identifier is accepted from the external terminal after the identifier is displayed by the display unit, generate a public key and a private key and transmit the generated public key to the external terminal.

Another aspect of the present invention provides a method of controlling an image processing apparatus with which an external terminal can communicate, the method comprising: accepting a connection request from the external terminal; generating an identifier of a first number of digits that is assigned to the external terminal when an initial connection request is accepted; displaying the generated identifier; and controlling to, when information corresponding to the identifier is accepted from the external terminal after the identifier is displayed, generate a public key and a private key and transmit the generated public key to the external terminal.

Still another aspect of the present invention provides a non-transitory computer-readable storage medium storing a computer program for causing a computer to execute a method of controlling an image processing apparatus with which an external terminal can communicate, the method comprising: accepting a connection request from the external terminal; generating an identifier of a first number of digits that is assigned to the external terminal when an initial connection request is accepted; displaying the generated identifier; and controlling to, when information corresponding to the identifier is accepted from the external terminal after the identifier is displayed, generate a public key and a private key and transmit the generated public key to the external terminal.

Further features of the present invention will be apparent from the following description of exemplary embodiments with reference to the attached drawings.

BRIEF DESCRIPTION OF THE DRAWINGS

FIGS. 5A-5C are flowcharts for illustrating a processing flow for accepting an initial connection setting from the mobile terminal of the multifunction peripheral 100 according to an embodiment.

FIGS. 9A-9C are flowcharts for illustrating a processing flow for accepting an initial connection setting from the mobile terminal of the multifunction peripheral 100 according to an embodiment.

FIGS. 15A and 15B are flowcharts for illustrating a processing flow of the mobile terminal according to an embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Configuration of Image Processing Apparatus and Mobile Terminal>

Figure 1:
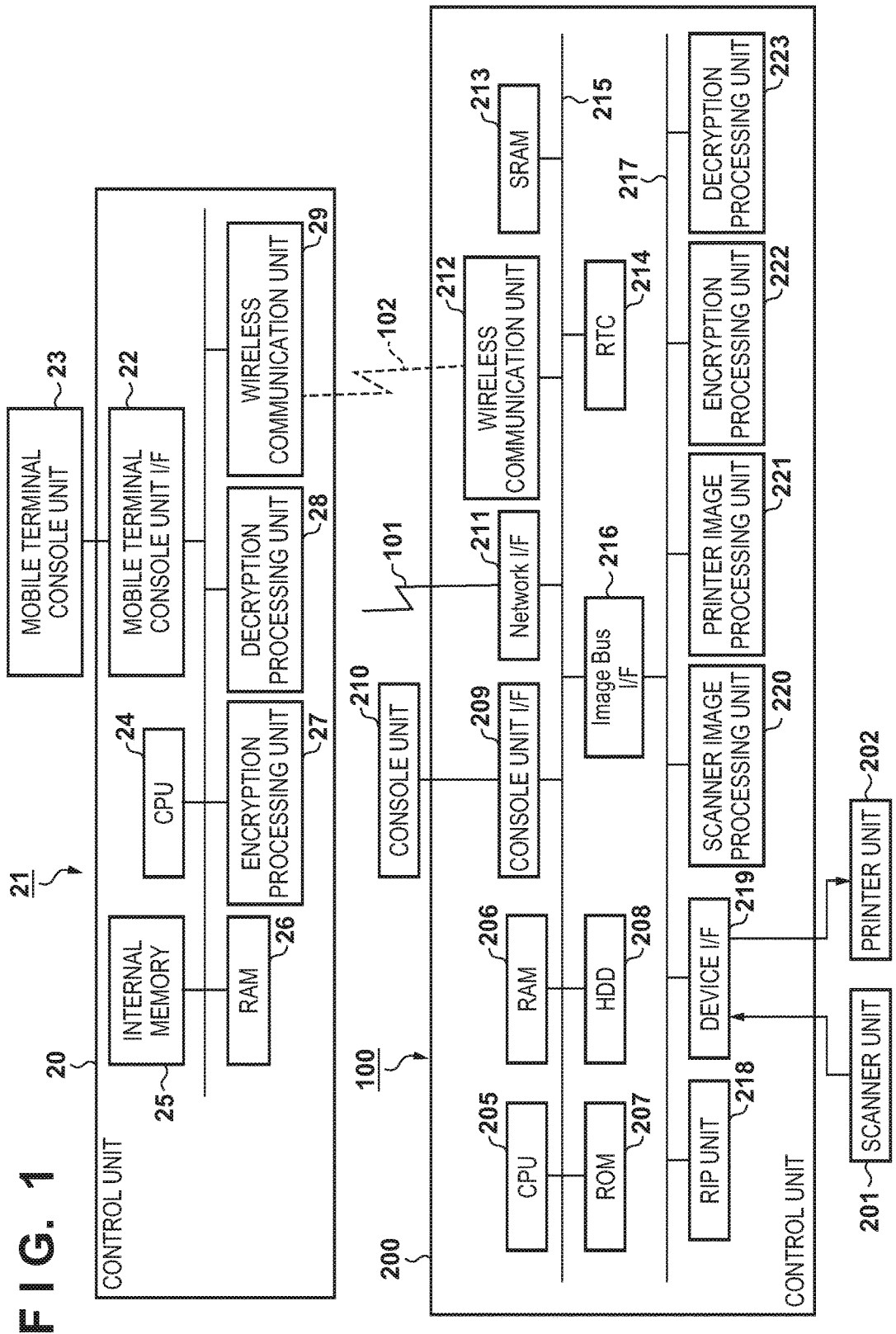
FIG. 1 is a block diagram of a multifunction peripheral 100 and a mobile terminal 21 according to an embodiment.

Below, explanation will be given for a first embodiment of the present invention. Firstly, an explanation is given for an overview configuration of a multifunction peripheral 100 which is an image processing apparatus and a mobile terminal 21 which is an external terminal according to the embodiment with reference to FIG. 1. An overview configuration of the multifunction peripheral 100 is illustrated in the bottom part and that of the mobile terminal 21 is illustrated in the upper part of FIG. 1. The multifunction peripheral 100 and the mobile terminal 21 are connected to be capable of communicating. In the present embodiment, this communication is explained with an example of communication using a Bluetooth connection.

Firstly, an explanation is given for the configuration of the multifunction peripheral 100. The multifunction peripheral 100 includes a control unit 200, a scanner unit 201, a printer unit 202, and a console unit 210. By the control unit 200 being connected to the scanner unit 201 which is an image input device or the printer unit 202 which is an image output device, while also being connected to a network 101 or a public line 204, inputting and outputting of image information or device information is performed. The control unit 200 includes a CPU 205, a RAM 206, a ROM 207, an HDD 208, a console unit I/F 209, a network I/F 211, a wireless communication unit 212, an SRAM 213, an RTC 214, and an image bus I/F 216. Furthermore, the control unit 200 includes an RIP unit 218, a device I/F 219, a scanner image processing unit 220, a printer image processing unit 221, an encryption processing unit 222, and a decryption processing unit 223.

The CPU 205 is a processor for controlling the entirety of the multifunction peripheral 100 comprehensively. The RAM 206 is a system work memory for operations of the CPU 205, and is also a memory for temporarily storing image data, user information, or passwords. The ROM 207 is a boot ROM, and a boot program of the system is stored therein. The HDD 208 is a hard disk drive, and system software, applications, or image data are stored therein. Also, programs for executing later described flowcharts according to the embodiments are stored in the HDD 208.

Each step of the flowcharts according to the embodiments is realized by the CPU 205 reading a program stored in the HDD 208 into the RAM 206 and executing it. However, a processor other than the CPU 205 may execute each step of the above described flowchart, or the CPU 205 and another processor may cooperate and execute processing in the above described flowchart.

The console unit interface (I/F) 209 is an interface unit to the console unit 210, which has a touch panel, and outputs to the console unit 210 image data to be displayed on the console unit 210. Also, information inputted by a user of the present system is transmitted from the console unit 210 to the CPU 205. The console unit 210 also assumes a role of a display as a user interface.

The network interface (I/F) 211 is connected to the network 101 and performs input and output of information. The wireless communication unit 212 is connected to a wireless network 102 and performs input and output of information. Wireless communication to the mobile terminal 21 is performed through the wireless communication unit 212.

The SRAM 213 is a non-volatile storage medium which is capable of high speed operation. The RTC 214 is a real-time clock and performs processing for continuously counting the current time even in a state without a power supply to the control unit 200. The above devices are arranged on a system bus 215.

The image bus I/F 216 connects the system bus 215 and an image bus 217 for transferring image data at a high rate, and is a bus bridge for converting a data structure. The image bus 217 is configured by a PCI bus or an IEEE 1394. The following devices are arranged on the image bus 217. The RIP unit 218 is a raster image processor, and extracts a PDL code into a bitmap image. The device I/F 219 connects the control unit 200 to the scanner unit 201 and the printer unit 202 which are image input and output devices, and performs a conversion between a synchronous system and an asynchronous system of image data.

The scanner image processing unit 220 performs correction, processing, or editing of input image data. The printer image processing unit 221 performs correction, a resolution conversion, or the like, for a printer on printed output image data. The encryption processing unit 222 performs encryption processing of input data which includes image data. The decryption processing unit 223 performs decryption processing of encrypted data.

Next, an explanation is given for a configuration of the mobile terminal 21. The mobile terminal includes a control unit 20 and a mobile terminal console unit 23. Also, the control unit 20 includes a mobile terminal console unit I/F 22, a CPU 24, an internal memory 25, a RAM 26, an encryption processing unit 27, a decryption processing unit 28, and a wireless communication unit 29.

The CPU 24 is a processor for controlling the entirety of the mobile terminal 21 comprehensively. The RAM 26 is a system work memory for operations of the CPU 24, and is also a memory for temporarily storing user information, passwords or the like. In the internal memory 25, a system boot program stores system software, applications, and image data. Also, programs for executing later described flowcharts in the present embodiment are stored in the internal memory 25. The encryption processing unit 27 performs encryption processing of input data or random number generation. The decryption processing unit 28 performs decryption processing of encrypted data.

A mobile terminal console unit interface (I/F) 22 is an interface unit for the mobile terminal console unit 23 having a touch panel, and outputs to the mobile terminal console unit 23 image data to be displayed on the mobile terminal console unit 23. Also, the mobile terminal console unit 23 performs a role of conveying information inputted by a user of the present system to the CPU 24. The mobile terminal console unit 23 also assumes a role of a display as a user interface. The wireless communication unit 29 is connected to the wireless network 102 and performs input and output of information. Wireless communication with the multifunction peripheral 100 is performed via the wireless communication unit 29.

Each step of the flowcharts of the present embodiment is realized by the CPU 24 reading a program stored in the internal memory 25 into the RAM 26 and executing it. However, a processor other than the CPU 24 may execute each step of the above described flowchart, or the CPU 24 and another processor may cooperate and execute processing in the above described flowchart.

<Screen Examples>

Figure 2:
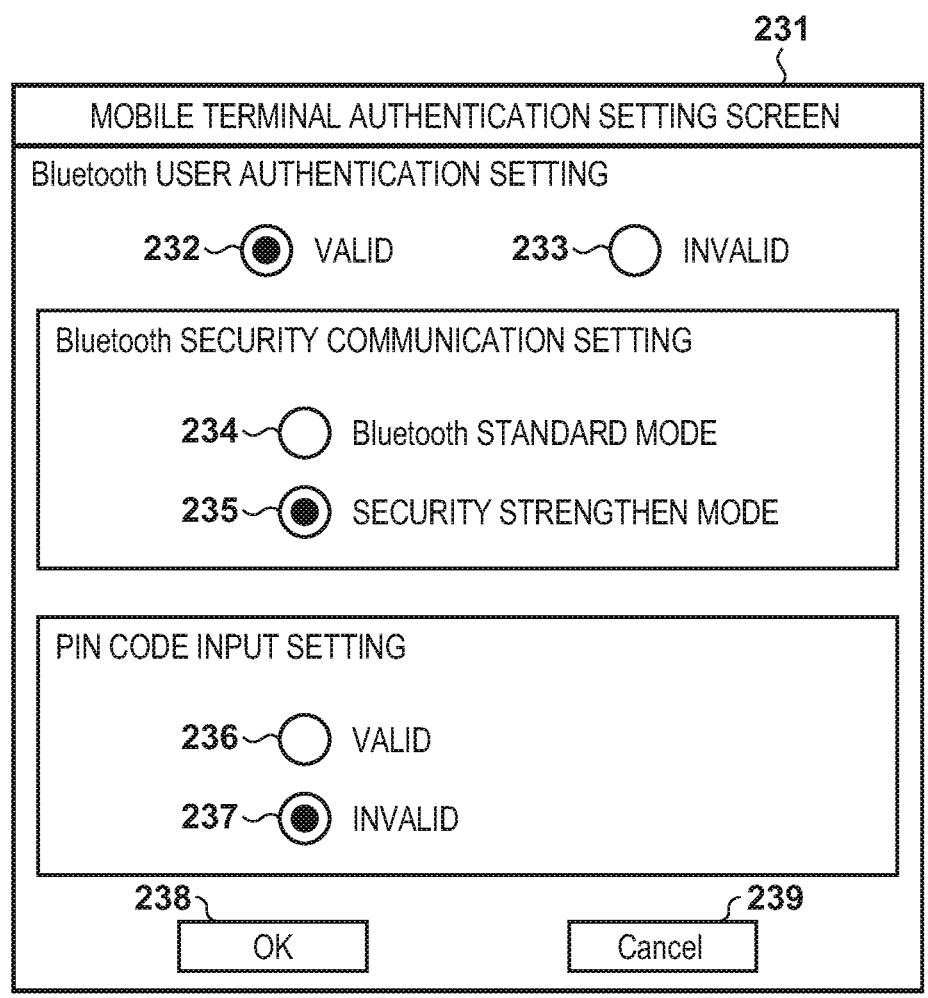
FIG. 2 is a view illustrating an example of an authentication setting screen of a mobile terminal of the multifunction peripheral 100.

Next, with reference to FIG. 2, an explanation is given for an authentication setting screen 231 of the mobile terminal that the multifunction peripheral 100 includes. The authentication setting screen 231 is displayed by the console unit 210. The authentication setting screen 231 of the mobile terminal is capable of switching a setting of a Bluetooth user authentication setting between valid 232 and invalid 233. In a case when the Bluetooth user authentication setting is valid 232, the multifunction peripheral 100 accepts connection requests for Bluetooth communication with the mobile terminal 21. In a case when the Bluetooth user authentication setting is invalid 233, the multifunction peripheral 100 does not perform connections for Bluetooth communication with the mobile terminal 21. Also, in a case where the Bluetooth user authentication setting is valid 232, it is made possible to switch a Bluetooth security communication setting (security mode).

In the present embodiment, two types of settings, "Bluetooth standard mode 234 (a first mode)" and "security strengthen mode 235 (a second mode)" exist. "Bluetooth standard mode" is an encrypted communication mode using a conventional Bluetooth PIN code. The PIN code explained in the present embodiment indicates a password number within 6-digits which is used normally. "Security strengthen mode" is a setting for realizing a path-encrypted communication with high security while preventing spoofing, and detailed control is described later. In a case when a Bluetooth security communication setting is set to the security strengthen mode 235, it is made to be possible to switch a setting of a PIN code input setting between valid 236 and invalid 237.

According to the present embodiment, these settings are inputted by the console unit 210 and the setting values are stored on the SRAM 213. In the example of FIG. 2, the Bluetooth user authentication setting is set to valid 232, the security strengthen mode 235 is selected, and the PIN code input setting is set to invalid 237. If an OK button 238 is selected after these settings are selected, the settings are finalized and stored on the SRAM 213. On the other hand, if a cancel button 239 is selected, the settings are not finalized and are cancelled.

Figure 3A:
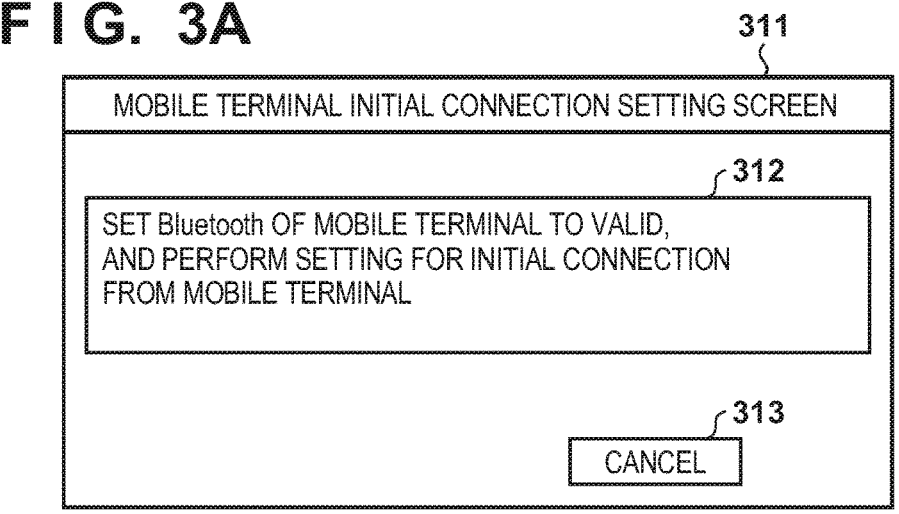
FIGS. 3A-3C are views illustrating examples of initial connection setting screens of the mobile terminal of the multifunction peripheral 100.
Figure 3B:
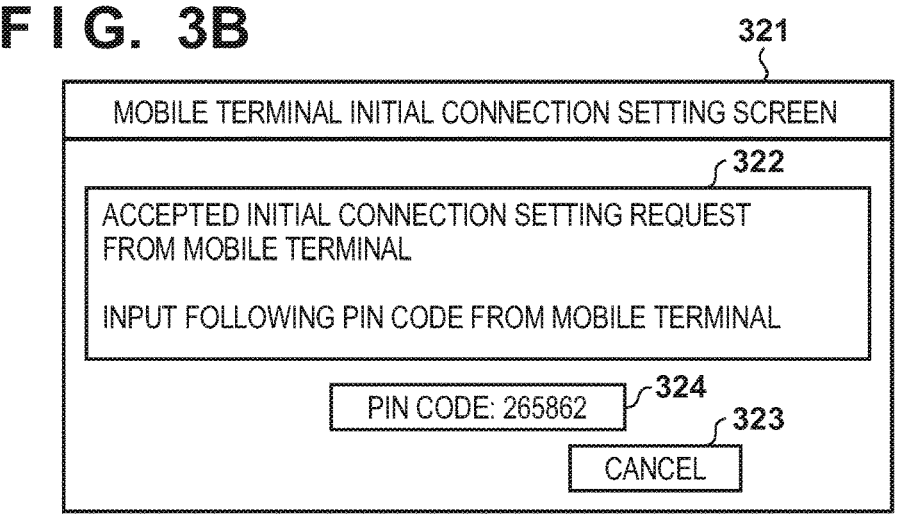
Figure 3C:
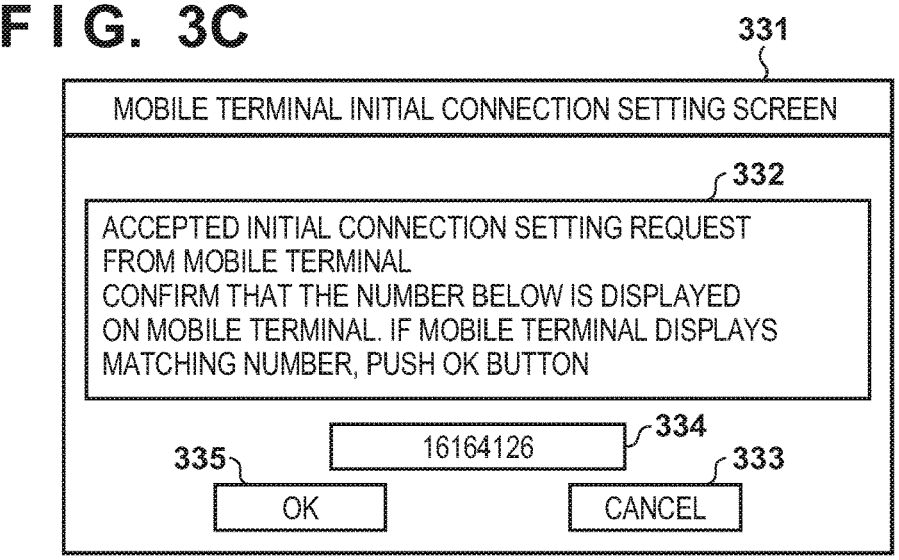

Next, with reference to FIGS. 3A-3C, an explanation is given for an initial connection setting screen 311 of the mobile terminal that the multifunction peripheral 100 includes. The initial connection setting screen 311 is displayed by the console unit 210. The initial connection setting screen 311 displays a message 312 required for the mobile terminal 21 to perform a Bluetooth communication to the multifunction peripheral 100. When the user confirms this screen, it is possible to returned to the screen displayed before by operating a cancel button 313. Detail of an initial connection setting screen 321 and 331 are described later.

Next, with reference to FIGS. 4A-4D, an explanation is given for a device connection setting screen 411 that the mobile terminal 21 has. The device connection setting screen 411 is displayed by the mobile terminal console unit 23. The device connection setting screen 411 displays a list of connected devices 412 to which the mobile terminal 21 is capable of outputting a Bluetooth connection request. When the user confirms this screen, it is possible to returned to the screen displayed before by operating a cancel button 413. Details of the device connection setting screens 421, 431 and 441 will be described later.

<Processing Procedure>

Figure 5B:
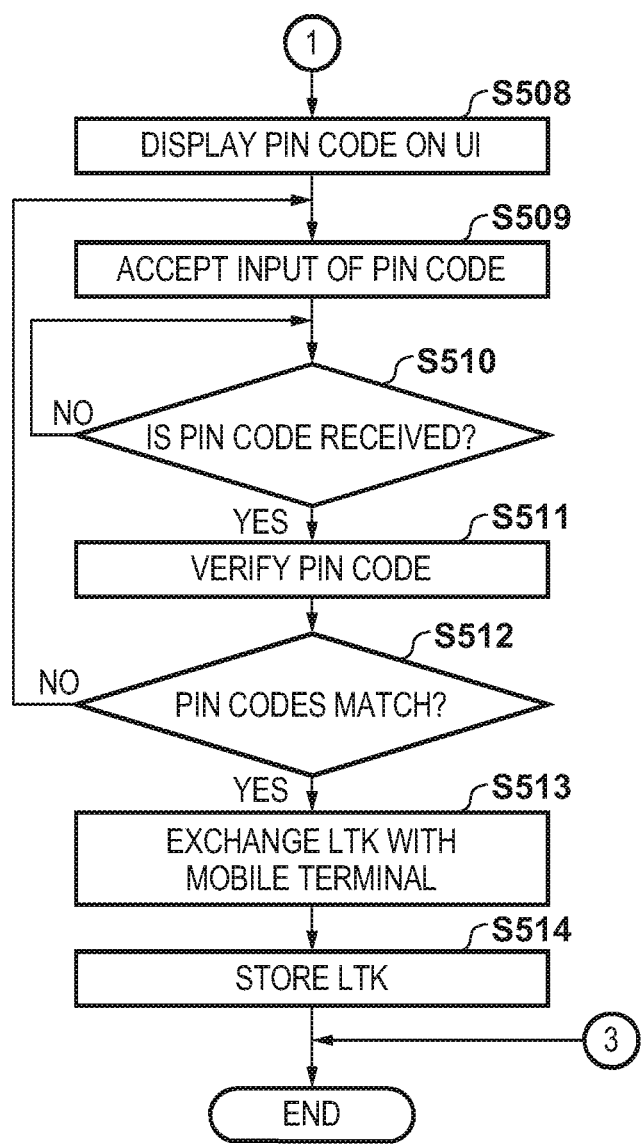
Figure 5C:
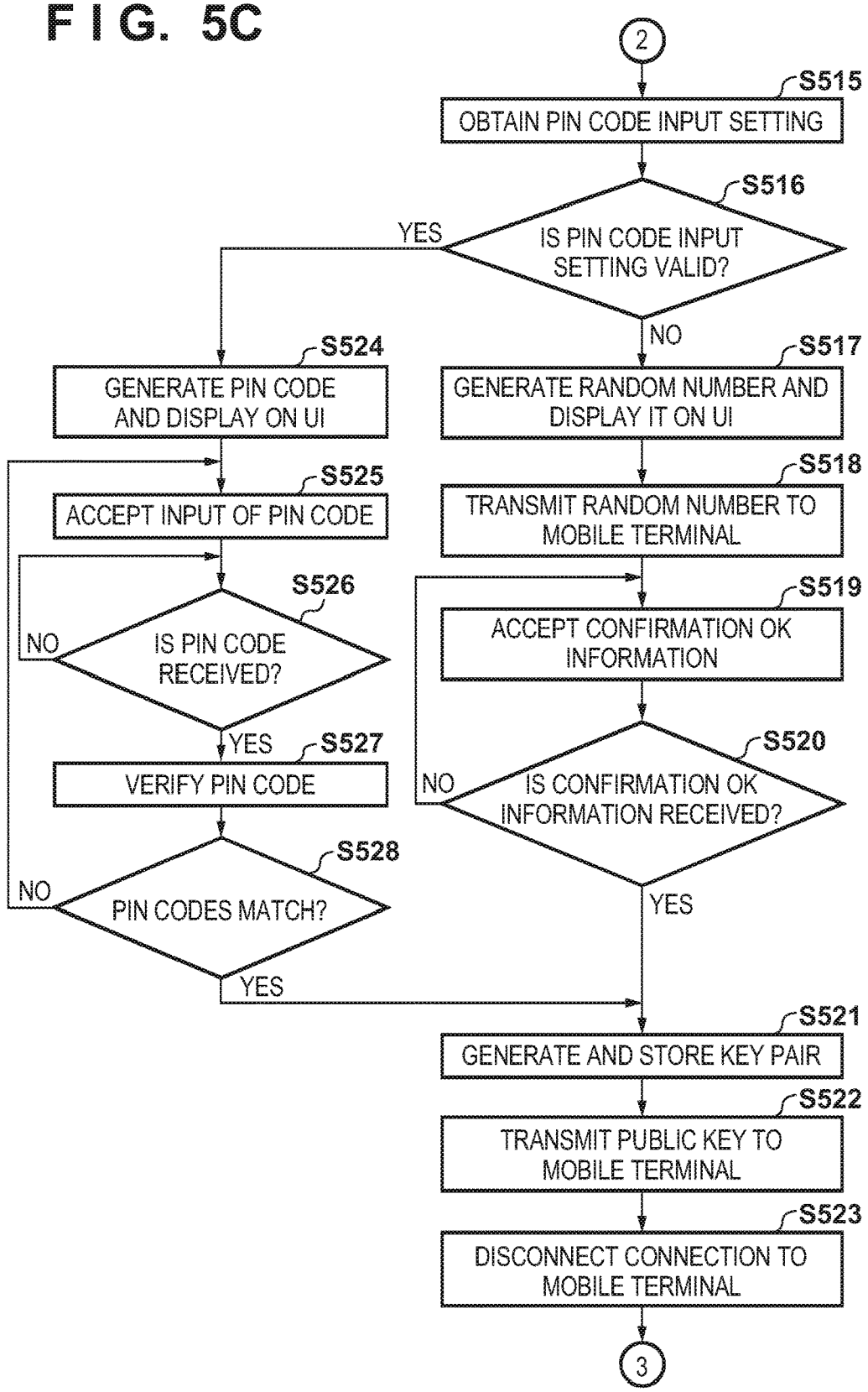

Next, an explanation is given for a processing procedure of the multifunction peripheral 100 transmitting information of a public key that is required for a user authentication in a case when an initial connection request is accepted from a mobile terminal according to the embodiment with reference to FIGS. 5A-5C. Processing of the multifunction peripheral 100 explained below is controlled by the control unit 200 in the multifunction peripheral 100. Specifically the processing explained below is realized by the CPU 205 reading a control program stored in the HDD 208 into the RAM 206 and executing it. Note, this flowchart is executed when the CPU 205 is functioning as an accepting unit and accepts a connection request from a mobile terminal.

In step S501, the CPU 205 obtains the Bluetooth user authentication setting set in the authentication setting screen 231 illustrated in FIG. 2 and stored in the SRAM 213. In step S502, the CPU 205 determines whether or not the obtained Bluetooth user authentication setting is valid. That is, it determines whether the Bluetooth user authentication setting was set to valid 232 or invalid 233 in the authentication setting screen 231 of FIG. 2. If in step S502 the CPU 205 determines that the obtained Bluetooth user authentication setting is invalid, this processing finishes.

On the other hand, in a case where it is determined that the Bluetooth user authentication setting is valid in step S502, the processing proceeds to step S503 and the CPU 205 accepts an initial connection setting request of the mobile terminal from the console unit 210. In step S504, the CPU 205 determines whether or not the initial connection setting request of the mobile terminal from the mobile terminal 21 is received. If received, the processing proceeds to step S505, and if not received, the processing returns to step S503. Note, in a case where the multifunction peripheral 100 is selected from out of the device list 412 of the device connection setting screen 411 in FIG. 4A by the console unit 23 of the mobile terminal 21, the initial connection setting request is transmitted from the mobile terminal 21 to the multifunction peripheral 100.

In step S505, the CPU 205 establishes a Bluetooth connection with the mobile terminal 21 in accordance with the received initial connection setting request. Next, the CPU 205 obtains a Bluetooth security communication setting from the SRAM 213 in step S506. In step S507, the CPU 205 determines whether the setting of the obtained Bluetooth security communication setting is the Bluetooth standard mode or the security strengthen mode. In a case of the Bluetooth standard mode, the processing proceeds to step S508, and in a case of the security strengthen mode, the processing proceeds to step S515.

Figure 6:
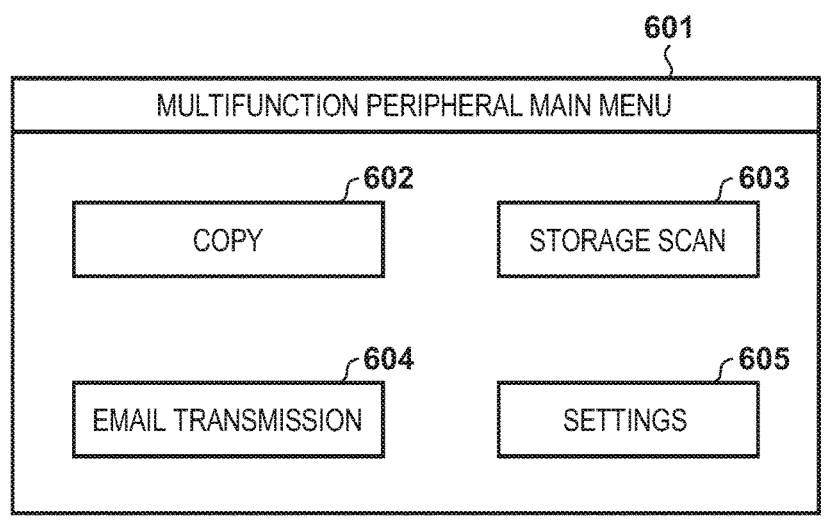
FIG. 6 is a view for illustrating an example of a main menu screen of the multifunction peripheral 100.

In step S508, the CPU 205 displays a PIN code on the console unit 210 of the multifunction peripheral 100. As shown in the initial connection setting screen 321 in FIG. 3B, the PIN code 324 is displayed along with a message 322. In the initial connection setting screen 321, an example in which "265862" is displayed as the PIN code is illustrated. According to the present embodiment, this PIN code is generated randomly with each acceptance of the initial connection setting request from the mobile terminal 21. In the multifunction peripheral 100 according to the embodiment, a specification is such that the screen returns to the multifunction peripheral main menu 601 illustrated in FIG. 6 after a fixed interval such as 60 seconds has elapsed. The multifunction peripheral main menu 601 is displayed so that each of function buttons 602-605 can be selected.

Next, in step S509, the CPU 205 accepts an input of a PIN code from the mobile terminal 21. In step S510, the CPU 205 determines whether or not a PIN code is received from the mobile terminal 21. If received, the processing proceeds to step S511, and if not received, this determination is repeated at fixed intervals. As illustrated in a device connection setting screen 421 of FIG. 4B, a PIN code is inputted through the screen displayed on the mobile terminal console unit 23 of the mobile terminal 21. The device connection setting screen 421 has a PIN code input field 423. The user input the PIN code into the PIN code input field 423 using the mobile terminal console unit 23. When a PIN code input OK button 425 is pressed, the CPU 24 of the mobile terminal 21 connects to the wireless network 102 using the wireless communication unit 29 and transmits the inputted PIN code to the multifunction peripheral 100. The transmitted PIN code is received by the multifunction peripheral 100 in step S509 as described above.

In step S511, the CPU 205 verifies whether or not the PIN code received from the mobile terminal 21 matches with the PIN code displayed on the console unit 210. Next, in step S512, the CPU 205 determines whether or not the PIN code received from the mobile terminal 21 matches with the PIN code displayed on the console unit 210 based on the verification result. In a case of a mismatch, the processing returns to step S509, and in a case of a match, the processing proceeds to step S513.

In step S513, the CPU 205 exchanges an LTK (Long Term Key) with the mobile terminal 21. Next, in step S514, the CPU 205 stores the exchanged LTK in the SRAM 213 and finishes this processing. The processes of step S508-step S514 are a conventional Bluetooth PIN code function and in a case where the side of the mobile terminal does not handle the security strengthen mode, it can be used in the multifunction peripheral 100 as a setting for emphasizing connectivity. However, a case where only a later described security strengthen mode can be selected to emphasize security is possible, and no particular limitation is made.

In step S507, in a case where the obtained Bluetooth user authentication setting is determined to be set to the security strengthen mode, the processing proceeds to step S515. In step S515, the CPU 205 obtains the PIN code input setting from the SRAM 213. In step S516, the CPU 205 determines whether the obtained PIN code input setting is valid or invalid. That is, it is determined whether the setting in FIG. 2 is set to valid 236 or invalid 237. In a case of valid, the processing proceeds to step S524 and in a case of invalid, the processing proceeds to step S517.

In step S517, the CPU 205 generates a random number and displays it on the console unit 210. As illustrated in an initial connection setting screen 331 in FIG. 3C, a random number 334 is displayed along with a message 332 in this screen. In the example of FIG. 3C, the random number "16164126" is displayed. According to the present embodiment, a different value is generated again for this random number with each acceptance of the initial connection setting request from the mobile terminal 21. Also, the random number is an 8-digit number (a second number of digits) and has larger number of digits than the 6-digit PIN code (a first number of digits). This number of digits of the random number is one example and there is no intention to limit the present application invention, and even larger numbers of digits may be used. Note that in the multifunction peripheral 100 according to the embodiment, a specification is such that the screen returns to the multifunction peripheral main menu 601 illustrated in FIG. 6 after a fixed interval such as 60 seconds has elapsed.

Figure 4A:
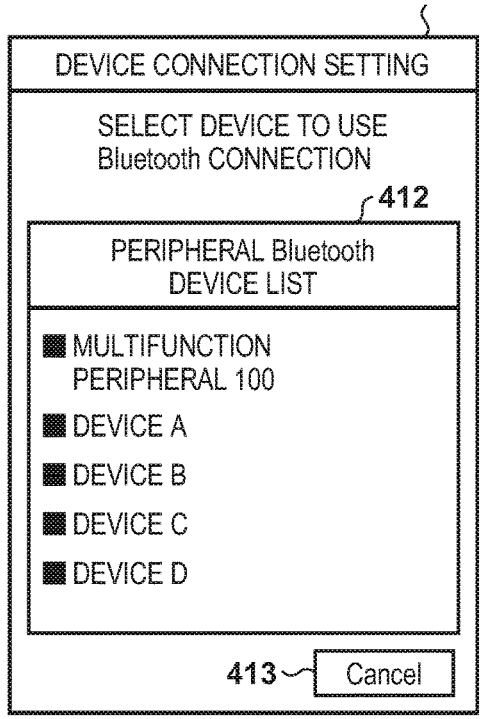
FIGS. 4A-4D are views illustrating examples of device connection setting screens of the mobile terminal 21.
Figure 4B:
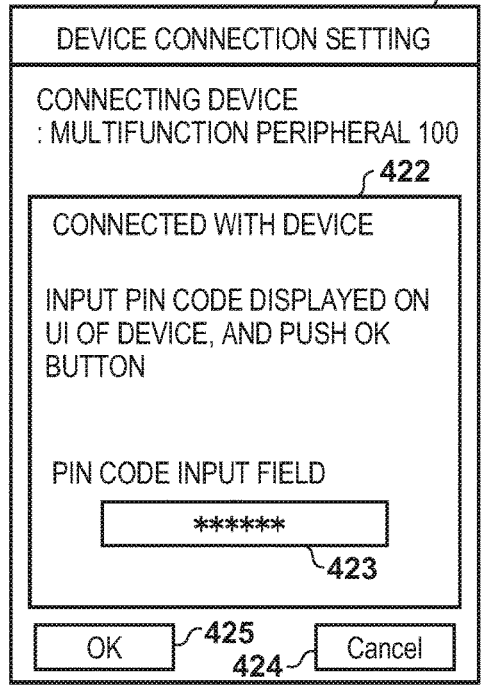
Figure 4C:
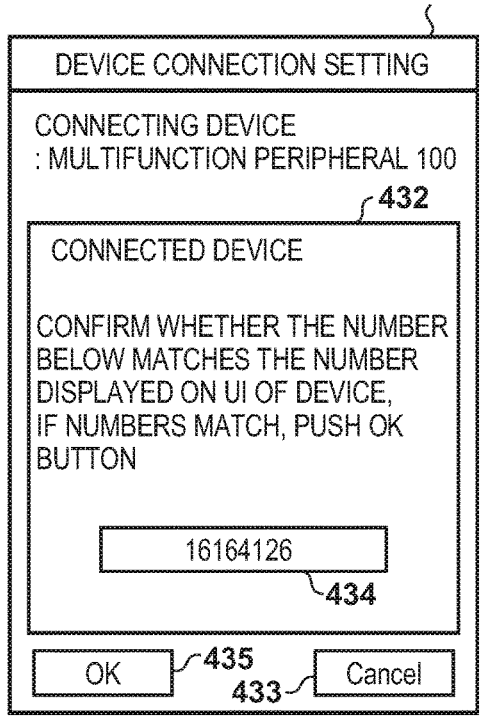

In step S518, the CPU 205 transmits the random number to the mobile terminal 21. A device connection setting screen 431 in FIG. 4C is a screen for displaying a message 432 and a random number 434 received by the mobile terminal 21 from the multifunction peripheral 100, and is displayed on the mobile terminal console unit 23.

The user can compare the random number 334 displayed on the console unit 210 of the multifunction peripheral 100 to the random number 434 displayed on the mobile terminal console unit 23 of the mobile terminal 21, to confirm whether or not the public key has been received from the correct multifunction peripheral 100 depending on whether or not they match. Thereby spoofing of the multifunction peripheral 100 can be prevented. In a case where the random numbers are determined to match, the user presses a confirmation OK button 435 through the mobile terminal console unit 23. The CPU 24 of the mobile terminal 21 determines the pressing of the confirmation OK button 435 and transmits confirmation OK information to the multifunction peripheral 100. On the other hand, in a case where the random numbers do not match, the user determines that there is a possibility of spoofing and presses a cancel button 433, then the connection setting can be caused to terminate.

Next, in step S519, the CPU 205 accepts the confirmation OK information from the mobile terminal 21. Here, confirmation OK information is confirmation information indicating that the mobile terminal 21 received the random number. In step S520, the CPU 205 determines whether or not a the confirmation OK information is received from the mobile terminal 21. If received, the processing proceeds to step S521, and if not received, the processing returns to step S519.

Figure 4D:
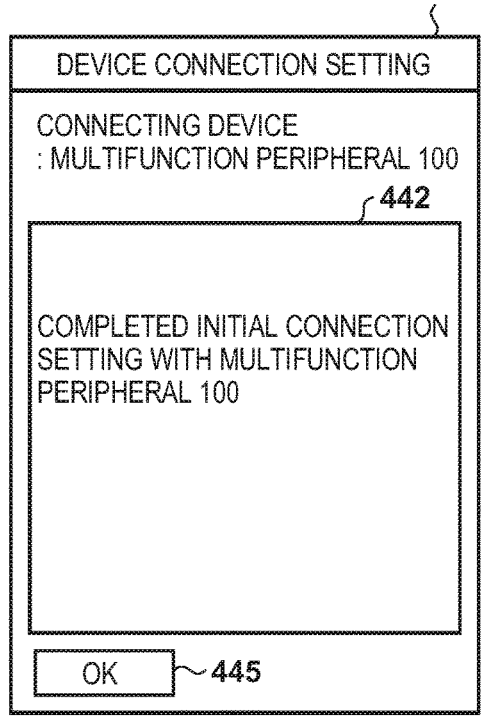

In step S521, the CPU 205 generates a key pair of a private key and a public key, and stores them in the SRAM 213. Next, in step S522, the CPU 205 transmits the public key to the mobile terminal 21. Here, after the mobile terminal 21 receives the public key from the multifunction peripheral 100, a device connection setting screen 441 illustrated in FIG. 4D is displayed on the mobile terminal console unit 23 and a completion of an initial connection setting is notified to the user. Next, in step S523 the CPU 205 disconnects a connection to the mobile terminal 21, and finishes this processing. In the processing of the above described step S517-step S522, the multifunction peripheral 100 can transmit a public key utilized in the user authentication to the mobile terminal 21 while preventing spoofing.

In step S516, in a case where it is determined that the obtained PIN code input setting is valid, the processing proceeds to step S524. In step S524, the CPU 205 displays a PIN code on the console unit 210. The screen displayed on the console unit 210 by the CPU 205 is similar to the initial connection setting screen 321 in FIG. 3B. Next, in step S525, the CPU 205 accepts an input of a PIN code from the mobile terminal 21. Here, the mobile terminal 21 accepts input of a PIN code through the device connection setting screen 421 and transmits the accepted PIN code to the multifunction peripheral 100. In step S526, the CPU 205 determines whether or not a PIN code is received from the mobile terminal 21. If received, the processing proceeds to step S527, and if not received, this processing is repeated at fixed intervals.

In step S527, the CPU 205 verifies whether or not the PIN code received from the mobile terminal 21 matches with the PIN code displayed on the console unit 210. Next, in step S528, the CPU 205 determines whether or not the PIN code received from the mobile terminal 21 matches with the PIN code displayed on the console unit 210 based on the verification result. In a case of determination of a mismatch, the processing returns to step S525, and in a case of a match, the processing proceeds to step S521. The processing after step S521 is described above, so the explanation is omitted.

For the above described step S517-step S522, the user is allowed to input a PIN code in the processing of step S524-step S528. The processing of step S517-step S522 can prevent spoofing, but the function is provided assuming a user who desires more strict operation. The above is control of the multifunction peripheral 100 in a case where an initial connection request is accepted from the mobile terminal in the present embodiment.

Figure 7A:
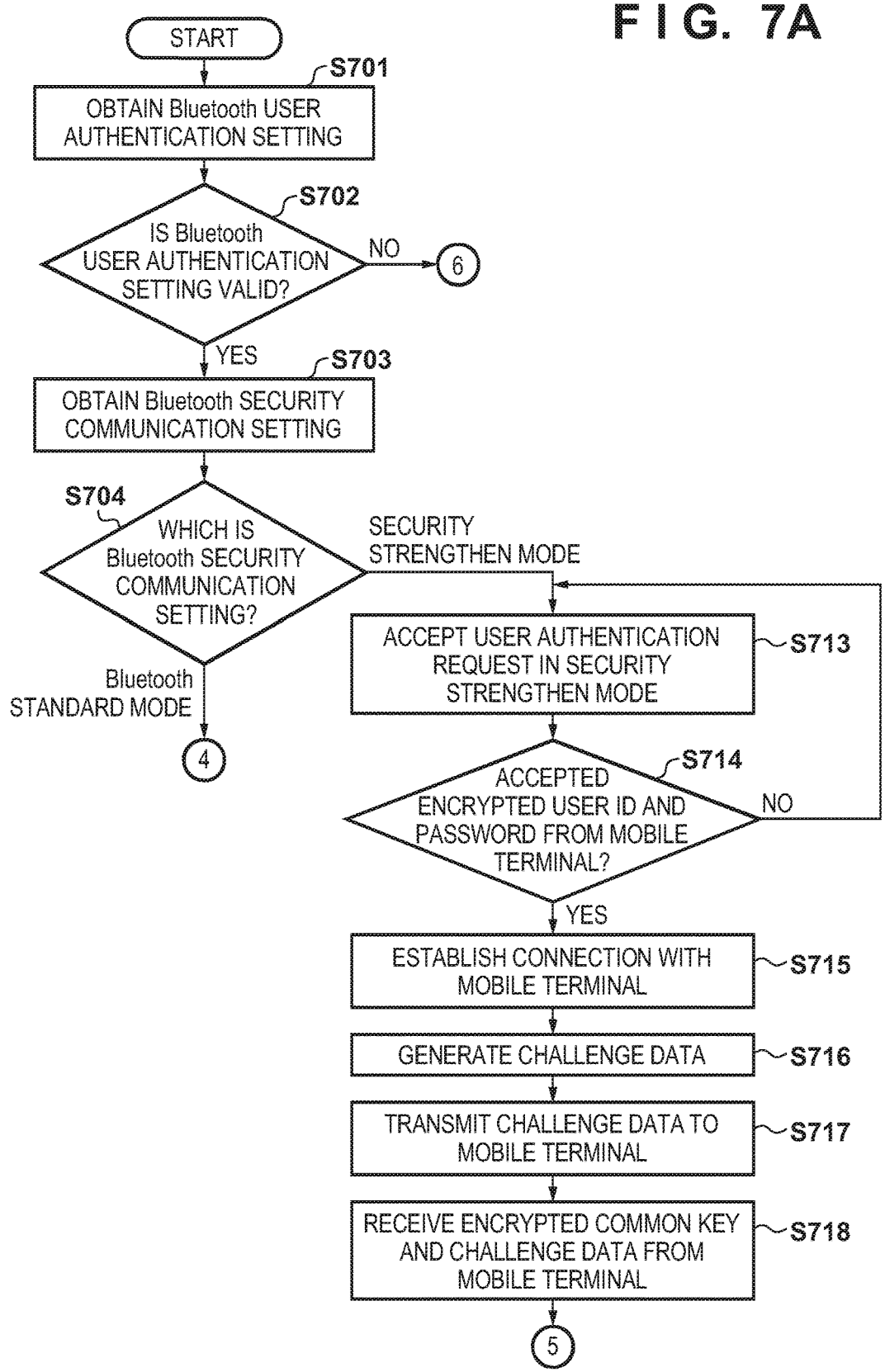
FIGS. 7A-7C are flowcharts for illustrating a processing flow for user authentication with the mobile terminal of the multifunction peripheral 100 according to an embodiment.
Figure 7B:
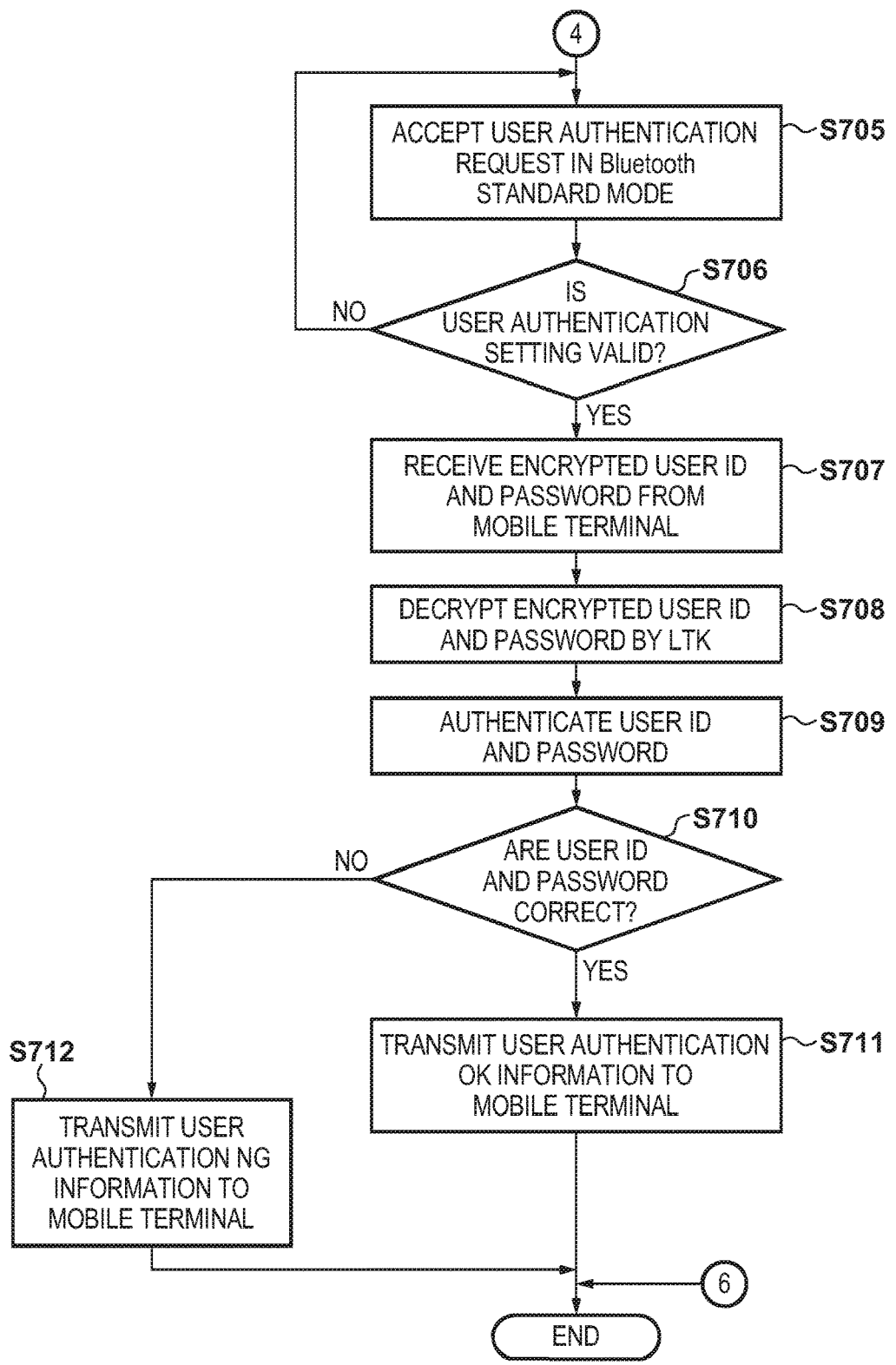
Figure 7C:
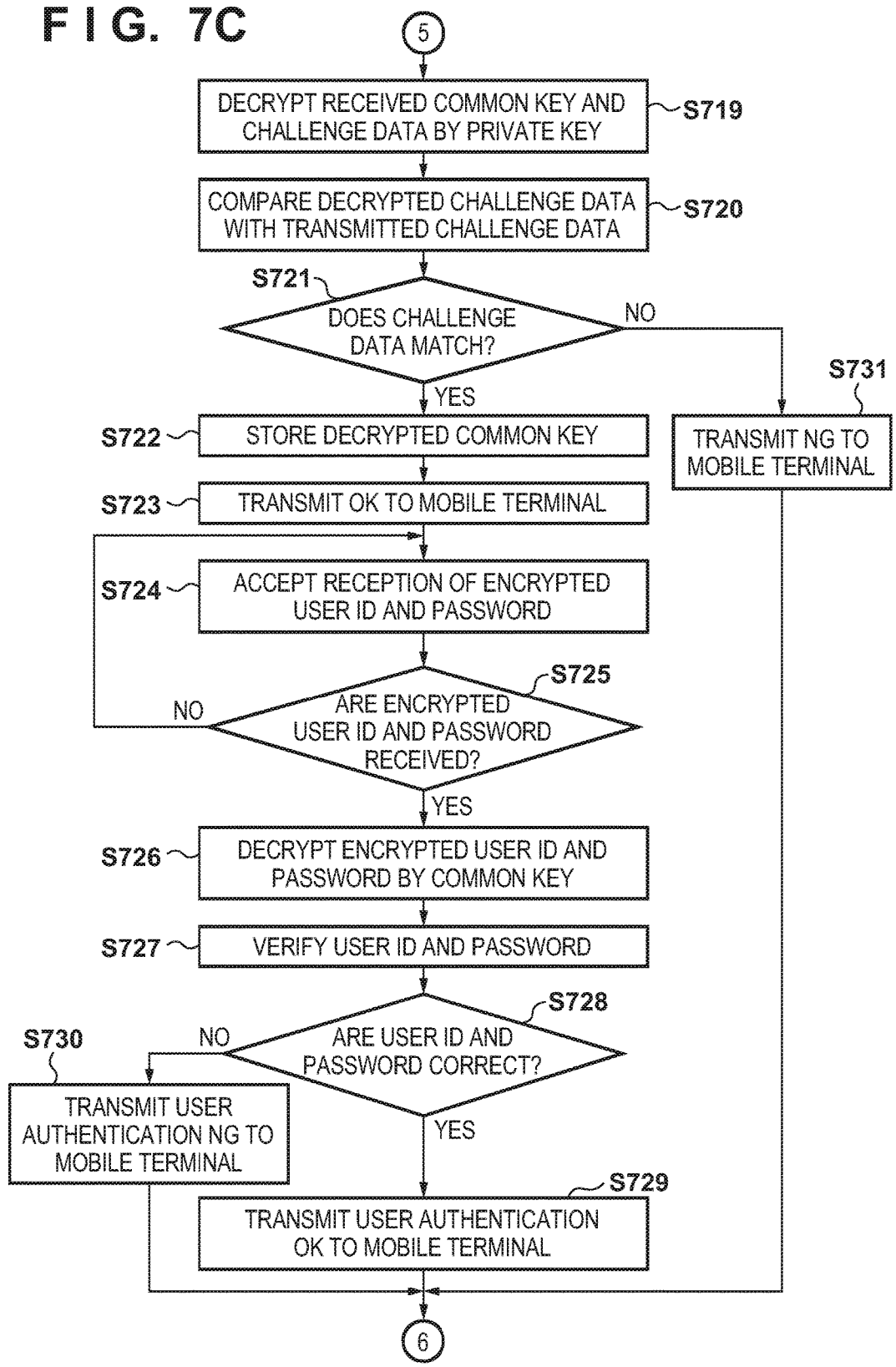

Next, with reference to FIGS. 7A-7C, an explanation is given for a processing procedure in which the multifunction peripheral 100 accepts a user authentication a second or subsequent time from the mobile terminal 21 using Bluetooth communication, and executes the user authentication. That is, in a case where the above described processing of the initial connection request illustrated in FIGS. 5A-5C is already performed, processing of this flowchart is executed. Processing of the multifunction peripheral 100 explained below is controlled by the control unit 200 in the multifunction peripheral 100. Specifically, the processing explained below is realized by the CPU 205 reading the control program stored in the HDD 208 to the RAM 206 and executing it.

In step S701, the CPU 205 obtains the Bluetooth user authentication setting set in the authentication setting screen 231 illustrated in FIG. 2 and stored in the SRAM 213. In step S702, the CPU 205 determines whether or not the obtained Bluetooth user authentication setting is valid. In a case of valid, the processing proceeds to step S703 and in a case of invalid, the processing terminates. If invalid, the multifunction peripheral 100 is in a state in which the user authentication is not accepted by the Bluetooth communication.

Next, the CPU 205 obtains the Bluetooth security communication setting from the SRAM 213 in step S703. In step S704, the CPU 205 determines whether the setting of the obtained Bluetooth security communication setting is the Bluetooth standard mode or the security strengthen mode. In a case of the Bluetooth standard mode, the processing proceeds to step S705, and in a case of the security strengthen mode, the processing proceeds to step S713.

In step S705, the CPU 205 accepts a user authentication request from the mobile terminal 21 in the Bluetooth standard mode. Subsequently, in step S706, the CPU 205 determines whether or not the user authentication request is accepted from the mobile terminal 21 via the Bluetooth standard mode. If accepted, the processing proceeds to step S707, and if not accepted, the processing returns to step S705.

Figure 8:
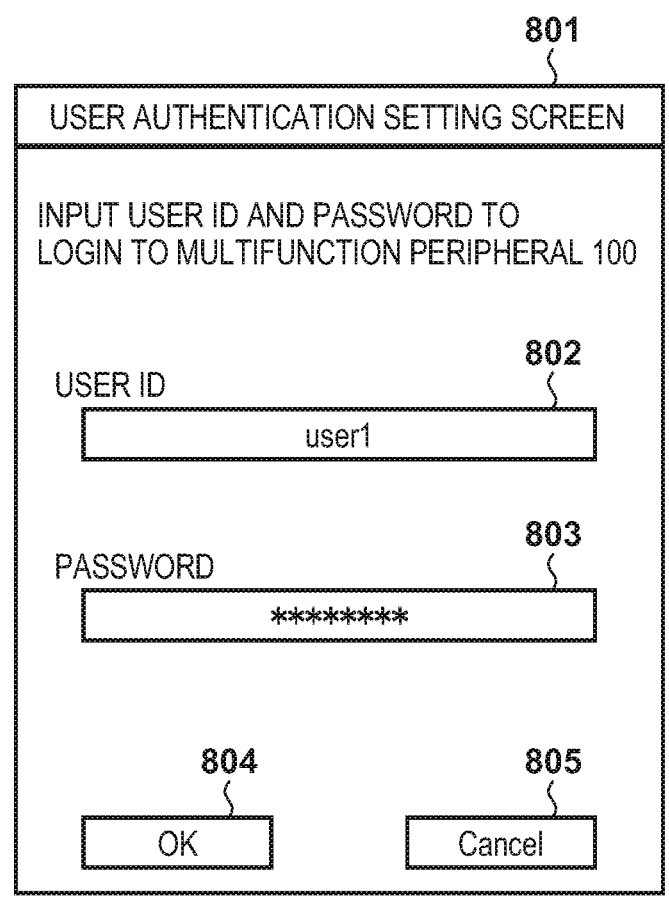
FIG. 8 is a view illustrating an example of a user authentication setting screen of the mobile terminal 21.

In step S707, the CPU 205 receives an encrypted user ID and password from the mobile terminal 21, and the processing proceeds to step S708. FIG. 8 illustrates a user authentication setting screen 801 for setting a user ID and password that the mobile terminal 21 will transmit to the multifunction peripheral 100. In the present embodiment, when a user performs the user authentication from the mobile terminal 21 to the multifunction peripheral 100, a user ID 802 and a password 803 are input in advance from the console unit 23, and are linked to the multifunction peripheral 100 and saved. The user, in a state in which the user ID 802 and the password 803 were inputted, can finalize and save the input by pressing an OK button 804, or can cancel the setting by pressing a cancel button 805. The user ID 802 and the password 803 are stored as long as settings of the mobile terminal 21 are not reset. By storing these, the multifunction peripheral 100 detects that the mobile terminal 21 is close, and processing of the user authentication is automatically performed by the Bluetooth communication.

Next, in step S708, as described above using FIGS. 5A-5C, the CPU 205 uses an LTK stored in advance in the SRAM 213, and decrypts the encrypted user ID and password. In step S709, the CPU 205 compares the information registered to the multifunction peripheral 100 with the decrypted user ID and password, and verifies whether it is correct. In step S710, the CPU 205 determines whether or not the user ID and the password are correct based on the verification result. In a case of correct, the processing proceeds to step S711 and in a case of not correct, the processing proceeds to step S712.

In step S711, the CPU 205 transmits user authentication OK information to the mobile terminal 21, and terminates this processing. Meanwhile, in step S712 the CPU 205 transmits user authentication NG (No Good) information to the mobile terminal 21, and finishes this processing. The processing up until steps S705 through S711 is a conventional Bluetooth path-encrypted communication function. In a case when the mobile terminal side does not handle the security strengthen mode, the multifunction peripheral 100 being used with an emphasis on connectivity as a setting is envisioned.

Meanwhile in a case where the Bluetooth user authentication setting obtained in step S704 is the security strengthen mode, the processing proceeds to step S713. In step S713, the CPU 205 accepts a user authentication request from the mobile terminal 21 in the security strengthen mode. Next in step S714 the CPU 205 determines whether or not the user authentication request is accepted from the mobile terminal 21 in the security strengthen mode. If accepted, the processing proceeds to step S715, and if not accepted, the processing returns to step S713.

In step S715, the CPU 205 establishes a Bluetooth connection with the mobile terminal 21. Subsequently, in step S716, the CPU 205 generates challenge data. Here, the challenge data according to the embodiment is a random value represented as a 16 digit English text code, and is something that is generated at every time of connection. Note, so long as it is a value that is impossible to predict in advance, the generation method is not particularly limited.

In step S717, the CPU 205 transmits the generated challenge data to the mobile terminal 21. In step S718, the CPU 205 receives the challenge data and the common key encrypted with the public key from the mobile terminal 21, and the processing proceeds to step S719. During step S717 and step S718, the mobile terminal 21 encrypts the common key that the mobile terminal 21 generated and the received challenge data, according to the public key stored in advance in the control described above using FIGS. 5A-5C, and transmits them to the multifunction peripheral 100.

In step S719, the CPU 205 uses the received encrypted common key and a private key stored in the SRAM 213 to decrypt the challenge data. In step S720, the CPU 205 compares the decrypted challenge data with the challenge data generated in step S716. In step S721, the CPU 205 determines whether or not the decrypted challenge data and the challenge data generated in step S716 match from the comparison result. If they match the processing proceeds to step S722, and if they do not match the processing proceeds to step S731. In step S731, the CPU 205 transmits authentication NG to the mobile terminal 21 and terminates this processing.

Meanwhile, in step S722, the CPU 205 stores the decrypted common key to the SRAM 213, transmits OK information to the mobile terminal 21 in step S723, and the processing proceeds to step S724. After the processing in step S723, specifically after the mobile terminal 21 receives the OK information from the multifunction peripheral 100, the mobile terminal 21 uses the common key to encrypt the encrypted user ID and password, and transmits the information to the multifunction peripheral 100.

In step S724 the CPU 205 accepts the user ID and password encrypted by the common key from the mobile terminal 21. In step S725, the CPU 205 determines whether or not the user ID and the password are received. If received, the processing proceeds to step S726, and if not received, the processing returns to step S724.

In step S726, the CPU 205 uses the common key stored in the SRAM 213 and decrypts the received user ID and password. In step S727, the CPU 205 verifies whether the information registered to the multifunction peripheral 100 matches the decrypted user ID and password. In step S728, the CPU 205 determines whether the result of the verification of the user ID and password is that they match. If they match the processing proceeds to step S729, and if they do not match the processing proceeds to step S730.

Meanwhile, in step S729 the CPU 205 transmits user authentication OK information to the mobile terminal 21, and finishes this processing. Meanwhile, in step S730 the CPU 205 transmits user authentication NG information to the mobile terminal 21, and finishes this processing. The above is an explanation of the control which accepts the user authentication by the Bluetooth communication from the mobile terminal 21 and executes the user authentication in the multifunction peripheral 100.

As described above, when the image processing apparatus according to the embodiment accepts the initial connection request from the mobile terminal (external terminal), assigns it to the mobile terminal, and generates an identifier (PIN code) of the first number of digits (within six digits for example). Furthermore, the image processing apparatus displays the generated identifier on the console unit 210, and when it accepts the information corresponding to the identifier from the mobile terminal, it compares the information with the generated identifier, and performs authentication. When the authentication is successful, a public key and a private key are generated, and the generated public key is transmitted to the mobile terminal. Because of this, on performing the user authentication from the mobile terminal 21 to the image processing apparatus, a path-encrypted communication for high security can be realized while preventing spoofing of the image processing apparatus, and it becomes possible to prevent a leak of confidential information of a user ID, password, and the like.

Also, in the image processing apparatus according to the present application invention, whether usage of a pin code is valid or invalid can be set, and when made to be invalid, a random number which has a second number of digits larger than the first number of digits which is the number of digits of the PIN code is generated, and is transmitted to the mobile terminal. In such a case, if the confirmation information indicating reception of the random number is received from the mobile terminal, a public key and a private key are generated, and the public key is transmitted to the mobile terminal. Because of this, input of the PIN code by a user can be omitted, and even if there is a case in which a brute force attack is performed during a time of inputting the PIN code, spoofing of the image processing apparatus is prevented and a security threat of the password information being obtained can be avoided.

Also, each time when a second or subsequent connection request is accepted, the image processing apparatus generates challenge data, transmits it to the mobile terminal, and then receives the challenge data and a common key encrypted by the public key which is generated upon the initial connection request as a response from the mobile terminal. When received, the private key, the challenge data, and the common key generated upon the initial connection request are decrypted, and if the generated challenge data received as the response matches challenge data, the common key is used to perform encrypted communication.

<Second Embodiment>

Below, explanation will be given for a second embodiment of the present invention. In the first embodiment described above, in a case when the security strengthen mode and a PIN input setting are invalid, the multifunction peripheral 100 transmits the public key to the mobile terminal 21 under a condition that the confirmation OK information is received from the mobile terminal 21. However, there are cases in which a number of simultaneous connections is limited by the device side specification in the Bluetooth communication. For example, in a case in which the number of simultaneous Bluetooth connections that the multifunction peripheral 100 can establish is "1", it becomes impossible to connect from another mobile terminal while a user is performing an initial connection setting on the mobile terminal 21. At this time, there is also a case in which the multifunction peripheral 100 itself becomes invisible when another mobile terminal is searching for a Bluetooth terminal. For this reason, the shorter the connection time between the multifunction peripheral and the mobile terminal, the more connectivity with another mobile terminals can be ensured, and convenience can be improved.

Figure 9B:
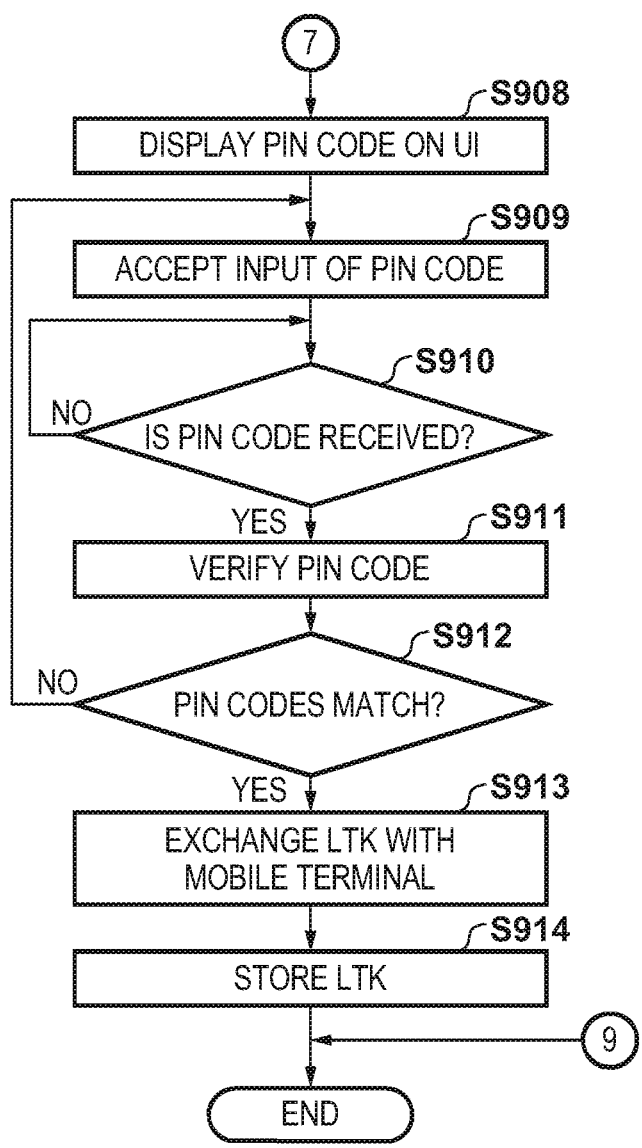

Accordingly, in the present embodiment, explanation is given regarding control in which after the multifunction peripheral 100, which has a function for Bluetooth communication with a mobile terminal, receives a connection request from the mobile terminal and then transmits a public key necessary for user authentication, the connection with the mobile terminal is immediately cut off. The processing procedure according to the embodiment will be described with reference to FIGS. 9A-9C. Processing of the multifunction peripheral 100 which is described hereinafter is controlled by the control unit 200 within the multifunction peripheral 100. Specifically the processing explained below is realized by the CPU 205 reading a control program stored in the HDD 208 into the RAM 206 and executing it. Note, the processing in FIGS. 9A-9C is a process in which the processing of step S929 through step S933 is added to the processing of FIGS. 5A-5C according to a first embodiment described above. Specifically, in the present embodiment, explanation of the processing of step S901 through step S928 of the flowchart illustrated in FIG. 9C is omitted because it is the same as the processing of step S501 through step S528 described in the flowchart of FIG. 5C in the first embodiment described above.

In step S916, in a case where it is determined that the obtained PIN code input setting is invalid, the processing proceeds to step S929. In step S929, the CPU 205 obtains a connection time shortening setting (a shortening function setting) for a time of an initial connection from the SRAM 213. After this the processing proceeds to step S930.

Figure 10:
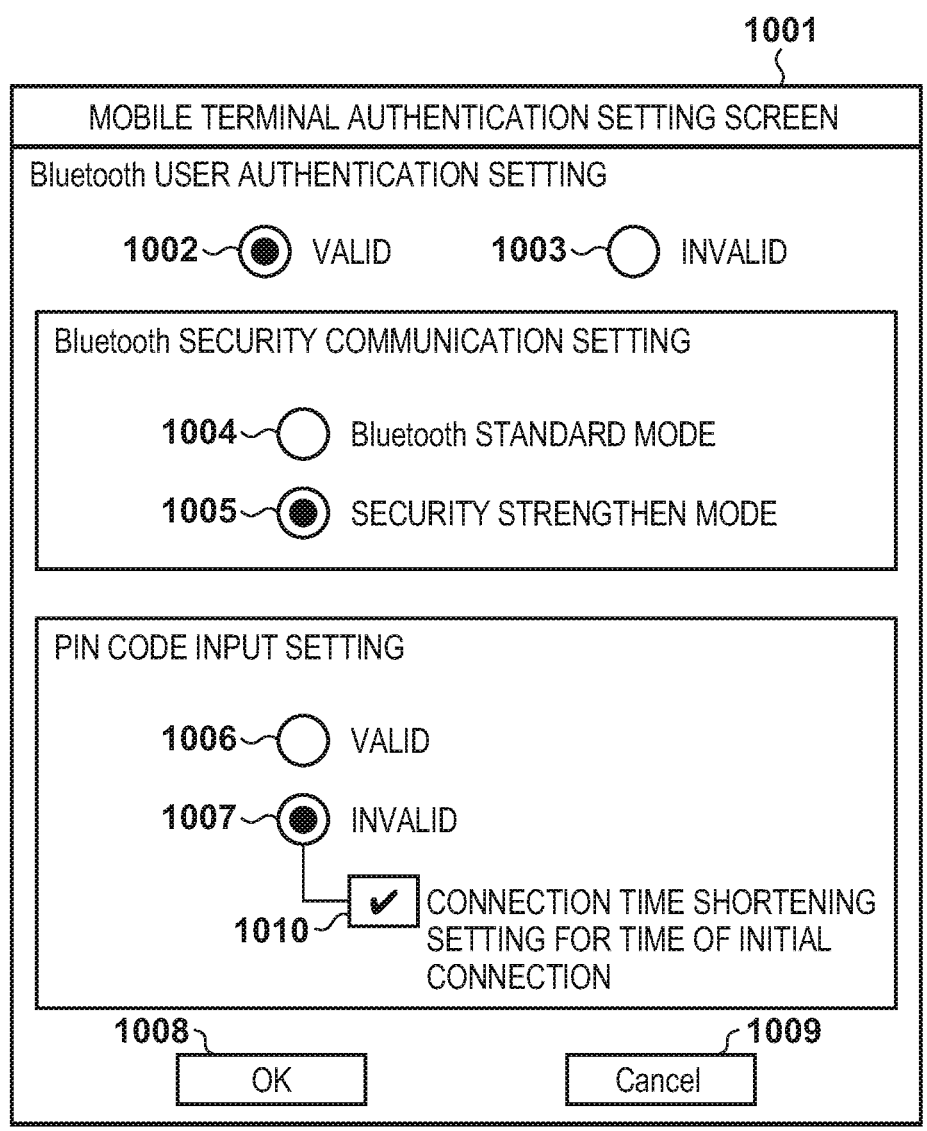
FIG. 10 is a view illustrating an example of an authentication setting screen of a mobile terminal of the multifunction peripheral 100 according to an embodiment.

FIG. 10 is an authentication setting screen 1001 of the mobile terminal by which it is possible to set a connection time shortening setting 1010 for a time of the initial connection, and is displayed on the console unit 210. Note, settings other than the connection time shortening setting 1010 for the time of the initial connection are the same as the settings described in FIG. 2 of the first embodiment described above. The connection time shortening setting 1010 for the time of the initial connection can be set only if the PIN code input setting is inactivated 1007. In a case when the user desires to validate the setting, they validate a check-box via the console unit 210. In the example of FIG. 10, an example of a screen on which the check-box is made to be valid and the connection time shortening setting 1010 for the time of the initial connection is made to be valid is illustrated. Note, this setting value is stored in the SRAM 213 similarly to other settings.

The explanation returns to FIGS. 9A-9C. In step S930, the CPU 205 determines whether or not the connection time shortening setting for the time of the initial connection is valid. If invalid the processing proceeds to step S917. The control after this is the same as the first embodiment described above so explanation is omitted.

On the other hand, if valid, the proceeding proceeds to step S931, and the CPU 205 generates a random number and the key pair of the public key and the private key. Subsequently, in step S932, the CPU 205 displays the random number to the console unit 210. In step S933, the CPU 205 transmits the generated random number and public key to the mobile terminal 21. Next, in step S923 the CPU 205 disconnects the connection to the mobile terminal, and finishes this processing.

By the above described control of step S929 through step S933 and step S923, if the connection time shortening setting for the time of the initial connection is valid, the connection is cut without waiting reception of the OK confirmation information from the mobile terminal. Because of this, the connection time between the multifunction peripheral 100 and the mobile terminal 21 is shortened, and if a number of possible simultaneous connections to multifunction peripherals 100 is small, the influence on other mobile terminals is reduced and it becomes possible to improve convenience.

<Third Embodiment>

Below, explanation will be given for a third embodiment of the present invention. In the present embodiment, on the image processing apparatus, after receiving a PIN code from a mobile terminal, it is determined whether or not the PIN code to be used in the initial connection is a fixed PIN code or a one-time PIN code. Furthermore, if it is determined that there is only a fixed PIN code, the image processing apparatus according to the embodiment issues a random number. Note, explanation of configurations and control that are the same as in the above described embodiment is omitted.

<Screen Example>

Figure 11:
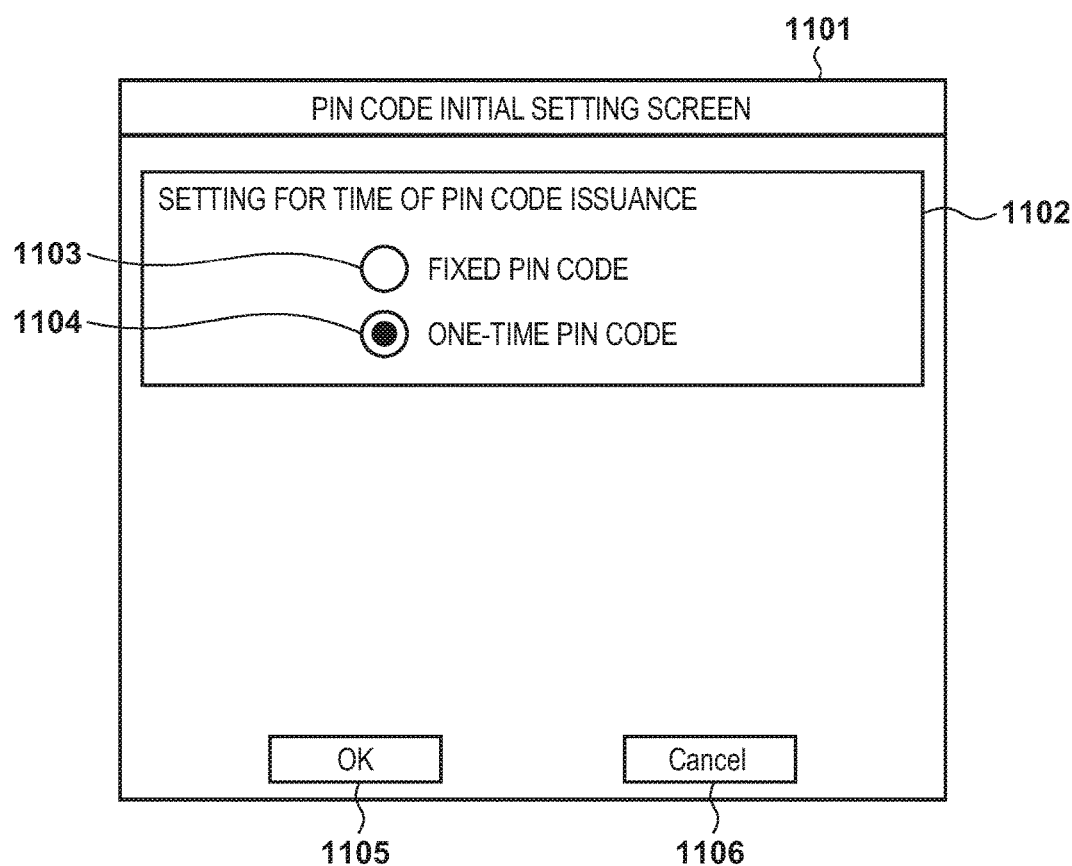
FIG. 11 is a view illustrating an example of a PIN code initial setting screen of a mobile terminal of the multifunction peripheral 100.

Firstly, a PIN code initial setting screen 1101 displayed in the console unit 210 of the multifunction peripheral 100 will be described with reference to FIG. 11. Note, the PIN code initial setting screen 1101 performs setting in advance as to whether to make the PIN code issued by the multifunction peripheral 100 a fixed PIN code or a one-time PIN code.

1102 is an input field for a setting for a time of PIN code issuance. 1103 is a radio button for making an issued PIN code be a fixed PIN code. 1104 is a radio button for making an issued PIN code be a one-time PIN code. Also, 1103 and 1104 are in a mutually-exclusive relationship, and it is impossible to make both valid simultaneously. Note, normally a system administrator performs the setting at a time of installation of the multifunction peripheral, and a general user cannot perform the setting. Also, a fixed PIN code is a PIN code registered in the multifunction peripheral and the mobile terminal in advance, the value are used non-overlappingly with one-time PIN codes. Also, in the present embodiment, a fixed PIN code is stored in the storage unit (the HDD 208) of the multifunction peripheral 100 and the storage unit (the RAM 26) of the mobile terminal 21 in advance.

<Processing Procedure>

Figure 12A:
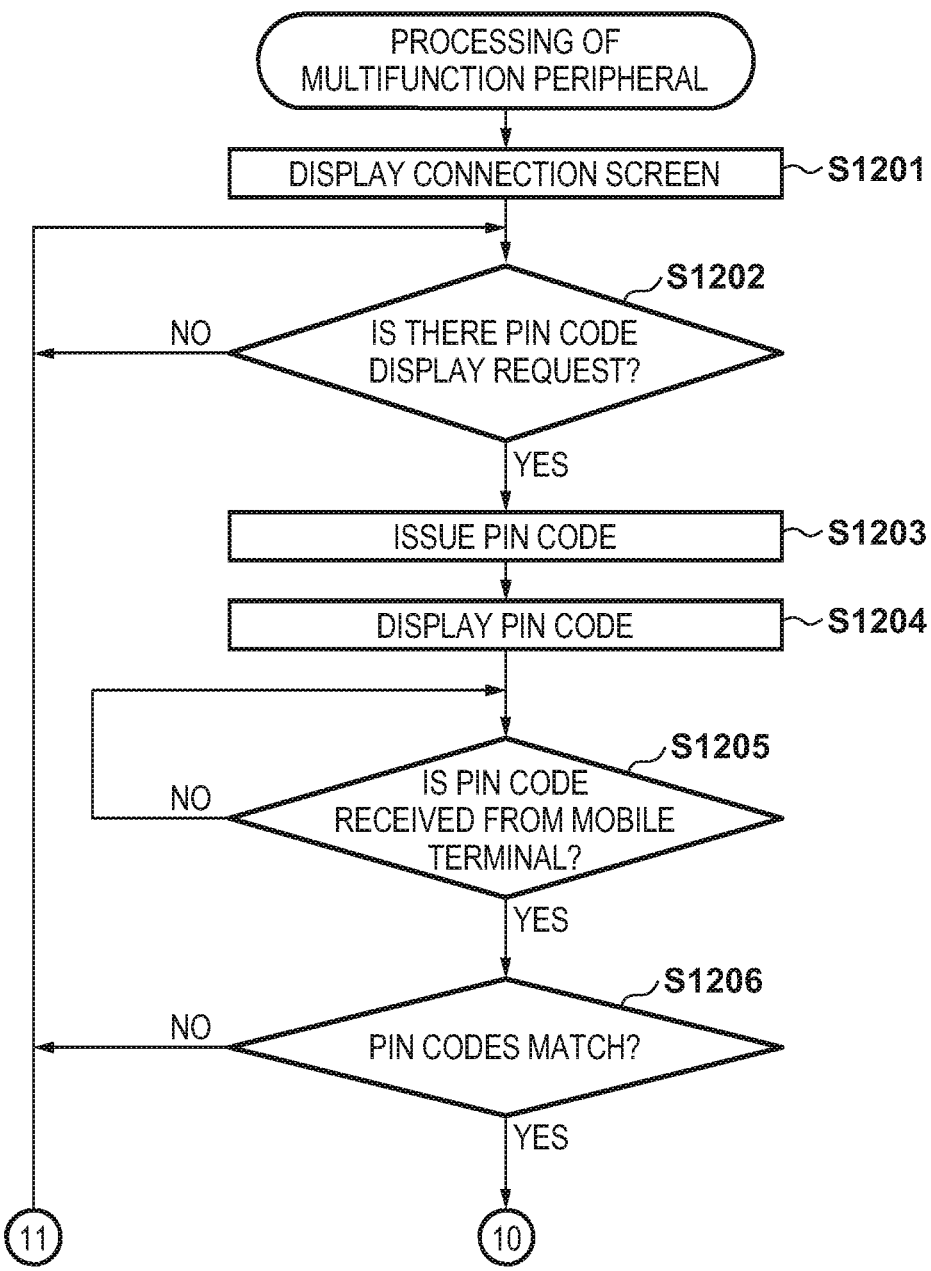
FIGS. 12A and 12B are flowcharts for illustrating a processing flow for accepting an initial connection setting from the mobile terminal of the multifunction peripheral 100 according to an embodiment.
Figure 12B:
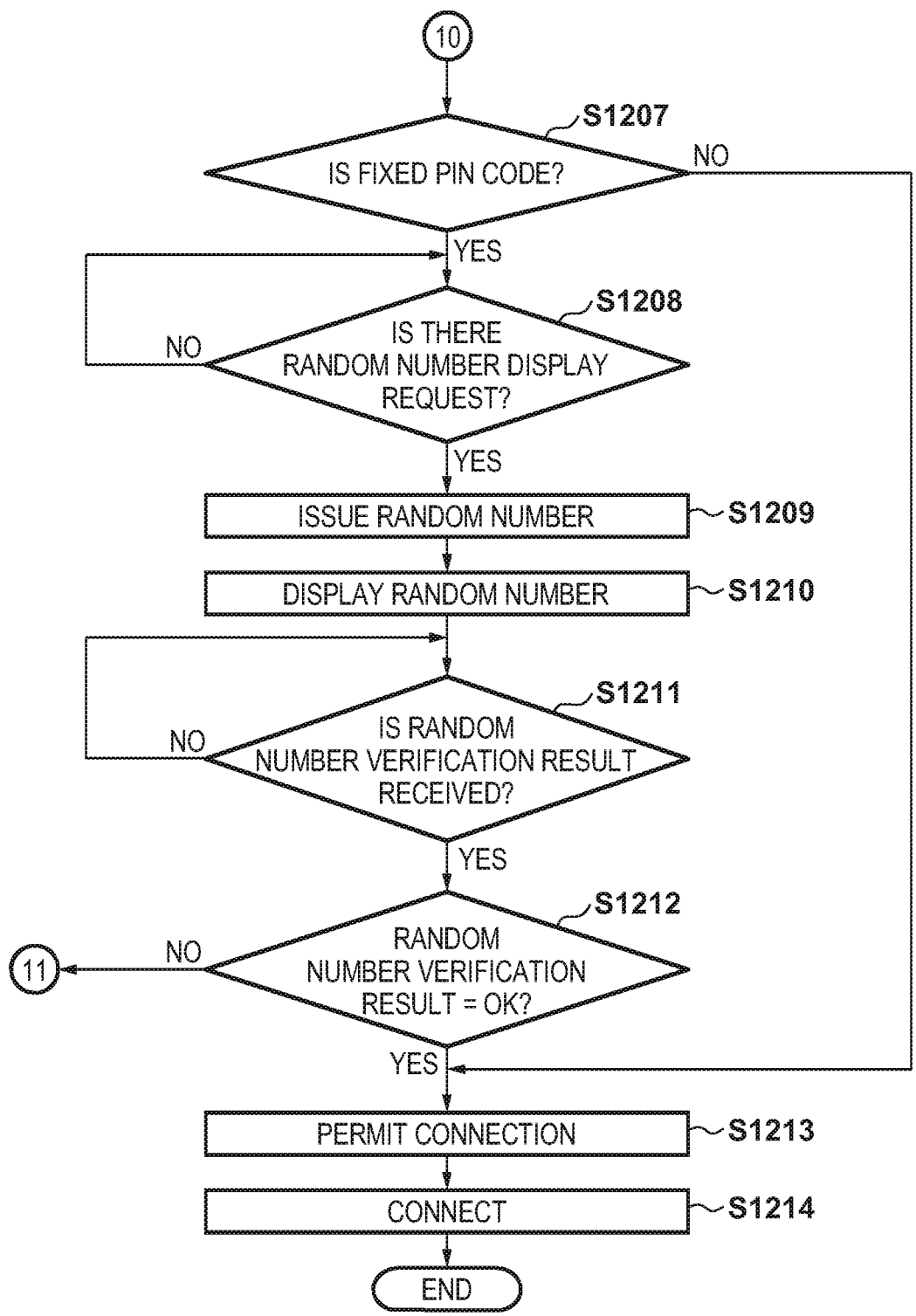

Next, with reference to FIGS. 12A and 12B, an explanation is given of a processing procedure in which the multifunction peripheral 100, which has a function for Bluetooth communication with a mobile terminal, receives a connection request from the mobile terminal and then connects. The processing of the multifunction peripheral 100 which is described hereinafter is controlled by the control unit 200 in the multifunction peripheral 100. Specifically the processing explained below is realized by the CPU 205 reading a control program stored in the HDD 208 into the RAM 206 and executing it.

In step S1201, the CPU 205 displays the initial connection setting screen 311 of the mobile terminal to the console unit 210. Subsequently, in step S1202, the CPU 205 waits for a PIN code display request to be transmitted via the wireless communication unit 212 from the mobile terminal 21. If the PIN code display request is accepted, the processing proceeds to step S1203. In step S1203, the CPU 205 issues the PIN code, and stores the PIN code into the HDD 208. Note, there are fixed PIN codes and one-time PIN codes. If the control unit 200 issues a fixed PIN code, a PIN code defined in advance is read from the HDD 208. If a one-time PIN code is issued, the control unit 200 obtains it by calculation. Note, whether or not the control unit 200 issues a fixed PIN code or issues a one-time PIN code is set in multifunction peripheral 100 on the PIN code initial setting screen 1101 by the system administrator (not shown) in advance.

In step S1204, the CPU 205 displays the initial connection setting screen 321 of the mobile terminal to the console unit 210. Note that on the initial connection setting screen 321 of the mobile terminal, the PIN code 324 is displayed. In the present embodiment the PIN code is displayed "265862". Subsequently, in step S1205, the CPU 205 determines whether or not a PIN code is received via the wireless communication unit 212 from the mobile terminal 21. If a PIN code is received, the processing proceeds to step S1206.

In step S1206, the CPU 205 compares the PIN code received in step S1205 and the PIN codes that the control unit 200 issued in step S1203. If the receipt PIN code and the issued PIN code are same, the processing proceeds to step S1207. Otherwise, the processing proceeds to step S1202.

In step S1207, the CPU 205 determines whether the PIN code being used is the fixed PIN code or the one-time PIN code. In such a case, the CPU 205 compares the PIN code being used and the fixed PIN code stored in the HDD 208. If the CPU 205 determines the PIN codes are the same, it is determined that the fixed PIN code is being used, and the processing proceeds to step S1208. On the other hand, if the CPU 205 determines the PIN codes are not the same, it is determined that a one-time PIN code is being used, and the processing proceeds to step S1213.

In step S1208, the CPU 205 waits for reception of a random number issuance request from the mobile terminal 21 via the wireless communication unit 212. If the random number issuance request is received, the processing proceeds to step S1209. In step S1209, the CPU 205 issues a random number, and stores the random number in the HDD 208. In step S1210 the CPU 205 displays the initial connection setting screen 331 of the mobile terminal on the console unit 210. Note, on the initial connection setting screen 331 of the mobile terminal, the random number is displayed. In the present embodiment, the random number "16164126" is displayed.

Next, in step S1211, the CPU 205 waits for reception of a random number verification result from the mobile terminal 21 via the wireless communication unit 212. If the verification result is received, the processing proceeds to step S1212. In step S1212, the CPU 205 determines whether or not the verification result received in step S1211 is OK. If the verification result is OK, the processing proceeds to step S1213, otherwise the processing proceeds to step S1202.

In step S1213, the CPU 205 determines that it is possible to authenticate with the mobile terminal 21, and permits the connection between the mobile terminal 21 and the multifunction peripheral 100. Subsequently, in step S1214, the CPU 205 causes the multifunction peripheral 100 to connect with the mobile terminal 21 via the wireless communication unit 212, and then terminates the processing.

Figure 13A:
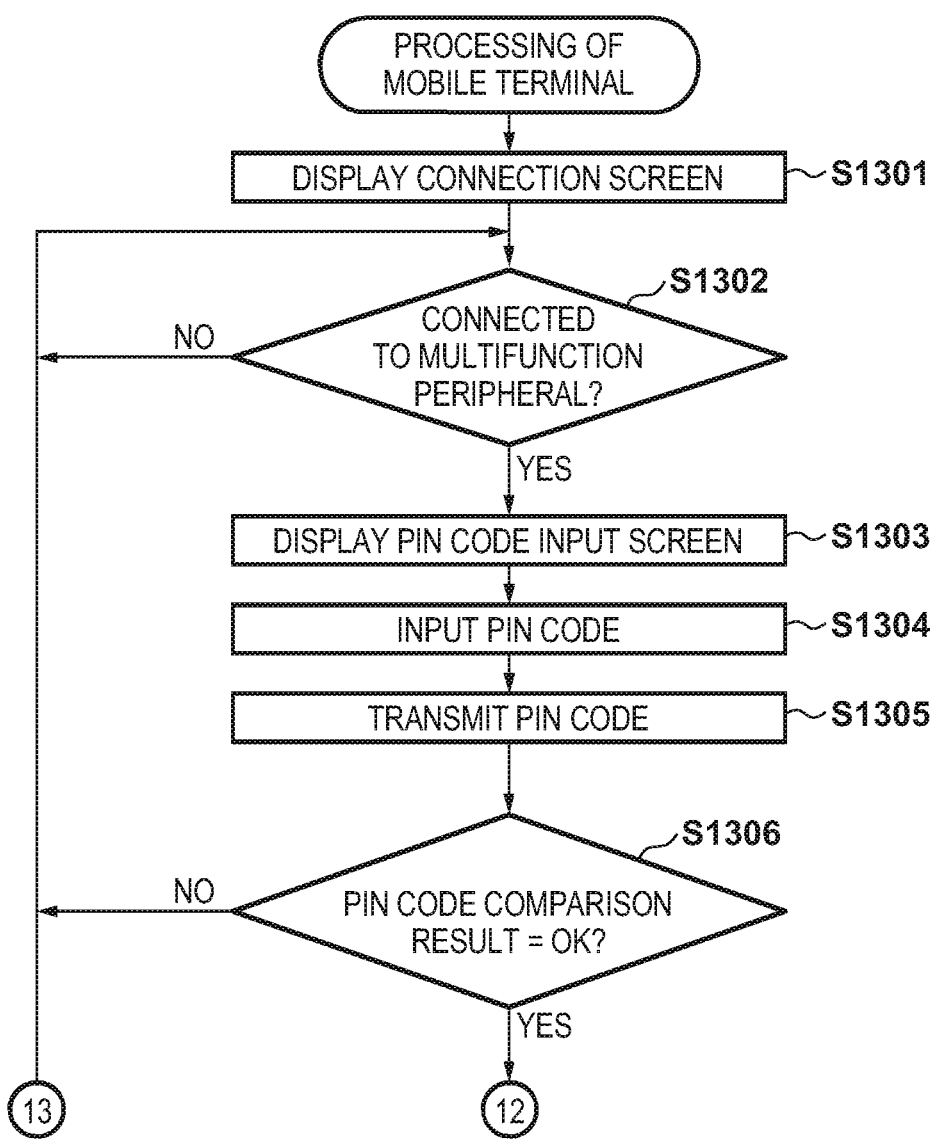
FIGS. 13A and 13B are flowcharts for illustrating a processing flow of the mobile terminal according to an embodiment.
Figure 13B:
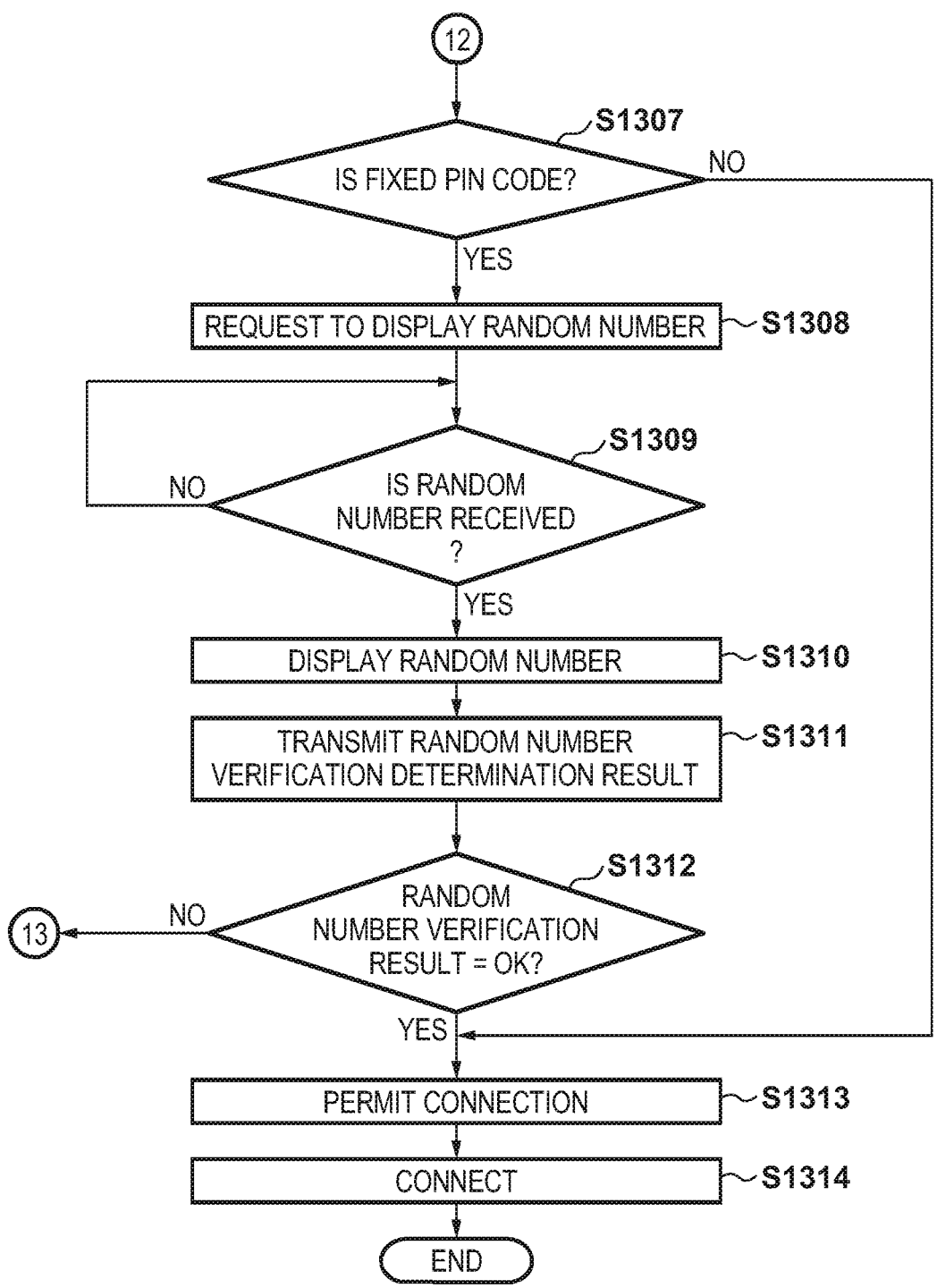

Next, the processing procedure of the mobile terminal 21 in the present embodiment will be described with reference to FIGS. 13A and 13B. Note, the processing of the mobile terminal 21 in the present specification is controlled by the control unit 20 in the mobile terminal 21. Specifically the processing explained below is realized by the CPU 24 reading a control program stored in the internal memory 25 into the RAM 26 and executing it.

In step S1301, the CPU 24 displays the device connection setting screen 411 to the mobile terminal console unit 23 in accordance with a request from the mobile terminal console unit 23. The device connection setting screen 411 displays a list of connected devices 412 to which the mobile terminal 21 is capable of outputting a Bluetooth connection request.

In step S1302, the CPU 24 selects a connection device among the list of connected devices 412 of the mobile terminal console unit 23 in accordance with a user input. Then, the CPU 24 makes a request for a connection to the multifunction peripheral 100 via the wireless communication unit 29 of the mobile terminal 21, and waits to be connected. If the CPU 24 detects a connection response of the multifunction peripheral 100, the processing proceeds to step S1303.

In step S1303, the CPU 24 displays the device connection setting screen 421 on the mobile terminal console unit 23. The screen that prompts an input of the PIN code is displayed in the PIN code input field 423 of this device connection setting screen 421. Subsequently, in step S1304, the CPU 24 detects the PIN code inputted by a user in the PIN code input field 423 of the device connection setting screen 421. In such a case, the PIN code that is displayed in the mobile terminal initial connection setting screen 321 which is displayed in the console unit 210 of the multifunction peripheral 100 is inputted. If the input of the PIN code is detected, the CPU 24 stores the inputted PIN code into the RAM 26, and the processing proceeds to step S1305.

In step S1305, the CPU 24 transmits the PIN code to the multifunction peripheral 100 via the wireless communication unit 29 of the mobile terminal 21. In step S1306, the CPU 24 receives from the multifunction peripheral 100 the determination result of the PIN code that is transmitted to the multifunction peripheral 100 from the mobile terminal 21 in step S1305. If the determination result indicates OK, the processing proceeds to step S1307, and if the determination result indicates NG, the processing proceeds to step S1302.

In step S1307, the CPU 24 determines whether the PIN code inputted in step S1304 and stored into the RAM 26 is a fixed PIN code or a one-time PIN code. If the CPU 24 determines that the PIN code inputted in step S1304 is a fixed PIN code, the processing proceeds to step S1308, and if it determines that it is a one-time PIN code, the processing proceeds to step S1313. Note, the CPU 24 performs the determination by reading from the RAM 26 the fixed PIN code defined in advance and comparing it with the inputted PIN code (the RAM 26). Also, it is assumed that the fixed PIN code defined in advance (the RAM 26) is something for which the same code as the PIN code that is stored in the HDD 208 of the multifunction peripheral 100 is stored.

In step S1308, the CPU 24 requests to display a random number to the console unit 210 of the multifunction peripheral 100 via the wireless communication unit 29. Subsequently, in step S1309, the CPU 24 waits for the random number that is displayed in the console unit 210 of the multifunction peripheral 100 to be received from the multifunction peripheral 100 via the wireless communication unit 29. If it determined that a random number value is received, the CPU 24 stores the random number value into the RAM 26, and the processing proceeds to step S1310.

In step S1310, the CPU 24 displays to the device connection setting screen 431 the random number value 434 that is received from the multifunction peripheral 100. Note, in the present embodiment, an example in which "16164126" is displayed as the random number value is illustrated.

In step S1311, the CPU 24 waits for the OK button 435 or the cancel button 433 to be pressed in the device connection setting screen 431 of the mobile terminal console unit 23. If the OK button 435 is pressed, the CPU 24 determines that the random number value displayed in the mobile terminal console unit 23 is the same as the random number value displayed in the console unit 210 of the multifunction peripheral 100. Then, the CPU 24 transmits that the result is OK to the multifunction peripheral 100 via the wireless communication unit 29 of the mobile terminal 21. On the other hand, if the cancel button 433 is pressed, it is determined that the random number value displayed in the mobile terminal console unit 23 is not the same as the random number value displayed in the console unit 210 of the multifunction peripheral 100. Then, the CPU 24 transmits that the result is NG to the multifunction peripheral 100 via the wireless communication unit 29 of the mobile terminal 21.

In step S1312, the CPU 24 determines whether or not the random number verification determination result transmitted in step S1311 is OK, and if it is OK, the processing proceeds to step S1313, and otherwise the processing proceeds to step S1302. In step S1313, the CPU 24 awaits a response from the multifunction peripheral 100 corresponding to transmission of the random number verification result in step S1311. If there is a response from the multifunction peripheral 100 via the wireless communication unit 29, the mobile terminal 21 is permitted to connect with the multifunction peripheral 100. In step S1314, the CPU 24 connects with the multifunction peripheral 100 via the wireless communication unit 29, and terminates the processing.

As described above, the image processing apparatus according to the embodiment determines for a PIN code received from the mobile terminal whether the PIN code, which is used in an initial connection, is a fixed PIN code or a one-time PIN code. Furthermore, the image processing apparatus issues a random number only if it determines that there is a fixed PIN code, and it is determined that there is a one-time PIN code, authentication is allowed to succeed, and connection permitted, without issuing the random number. Thus, according to the present embodiment, in the case of the authentication using a fixed PIN code, a random number is issued to improve security, and in the case of the one-time PIN code, the security capability is high to begin with, and so authentication can be performed quickly without issuing a random number. Note, in the present embodiment, the determination of whether or not it is the fixed PIN code is performed by determining whether or not the PIN code being used matches the fixed PIN code stored in the HDD 208.

<Fourth Embodiment>

Below, explanation will be given for a fourth embodiment of the present invention. In the present embodiment, a processing procedure to perform a determination of the fixed PIN code by a random number value issued in the multifunction peripheral 100 will be described. Note, explanation of configurations and control that are the same as in the above described embodiment are omitted.

<Processing Procedure>

Figure 14A:
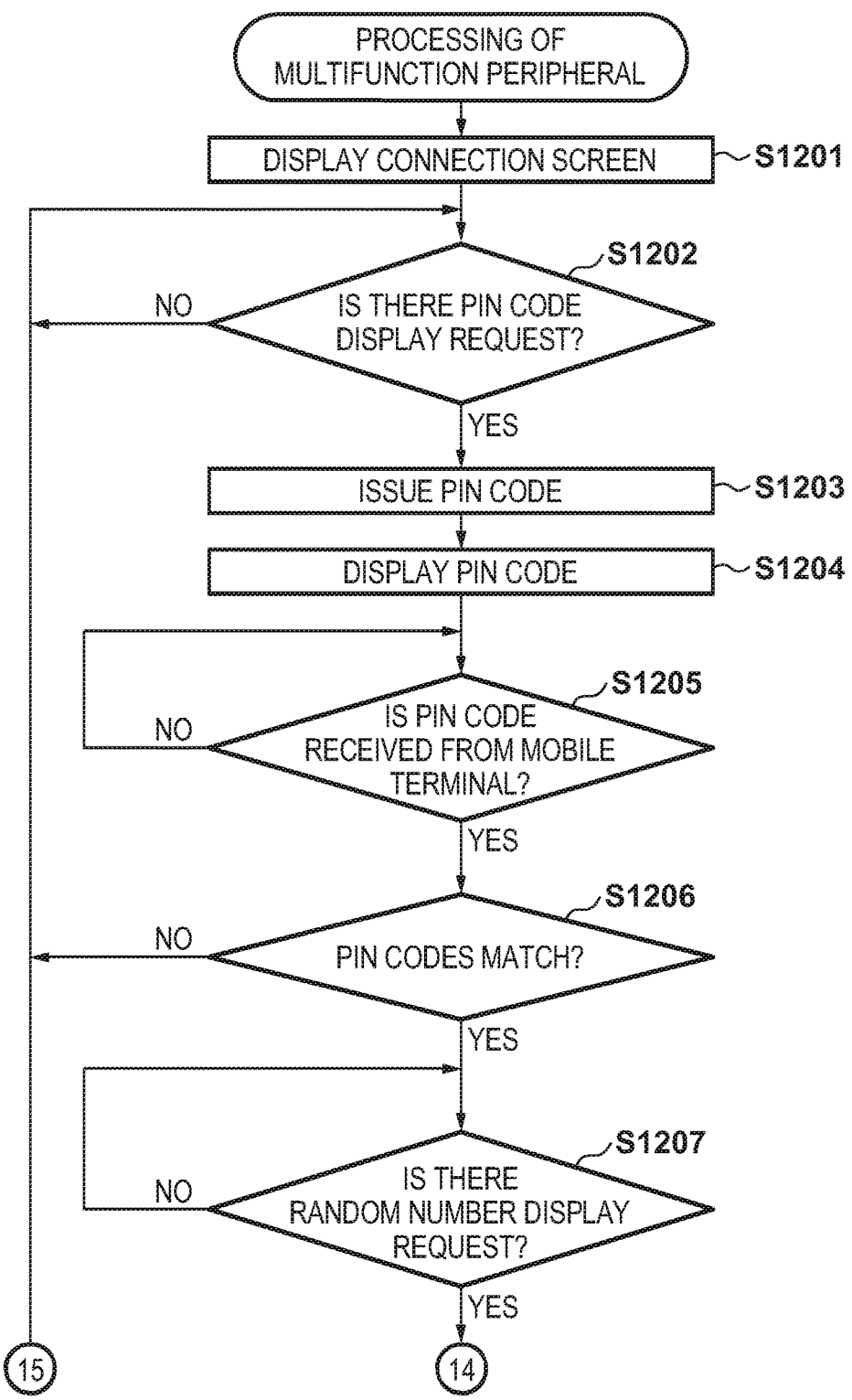
FIGS. 14A and 14B are flowcharts for illustrating a processing flow for accepting an initial connection setting from the mobile terminal of the multifunction peripheral 100 according to an embodiment.
Figure 14B:
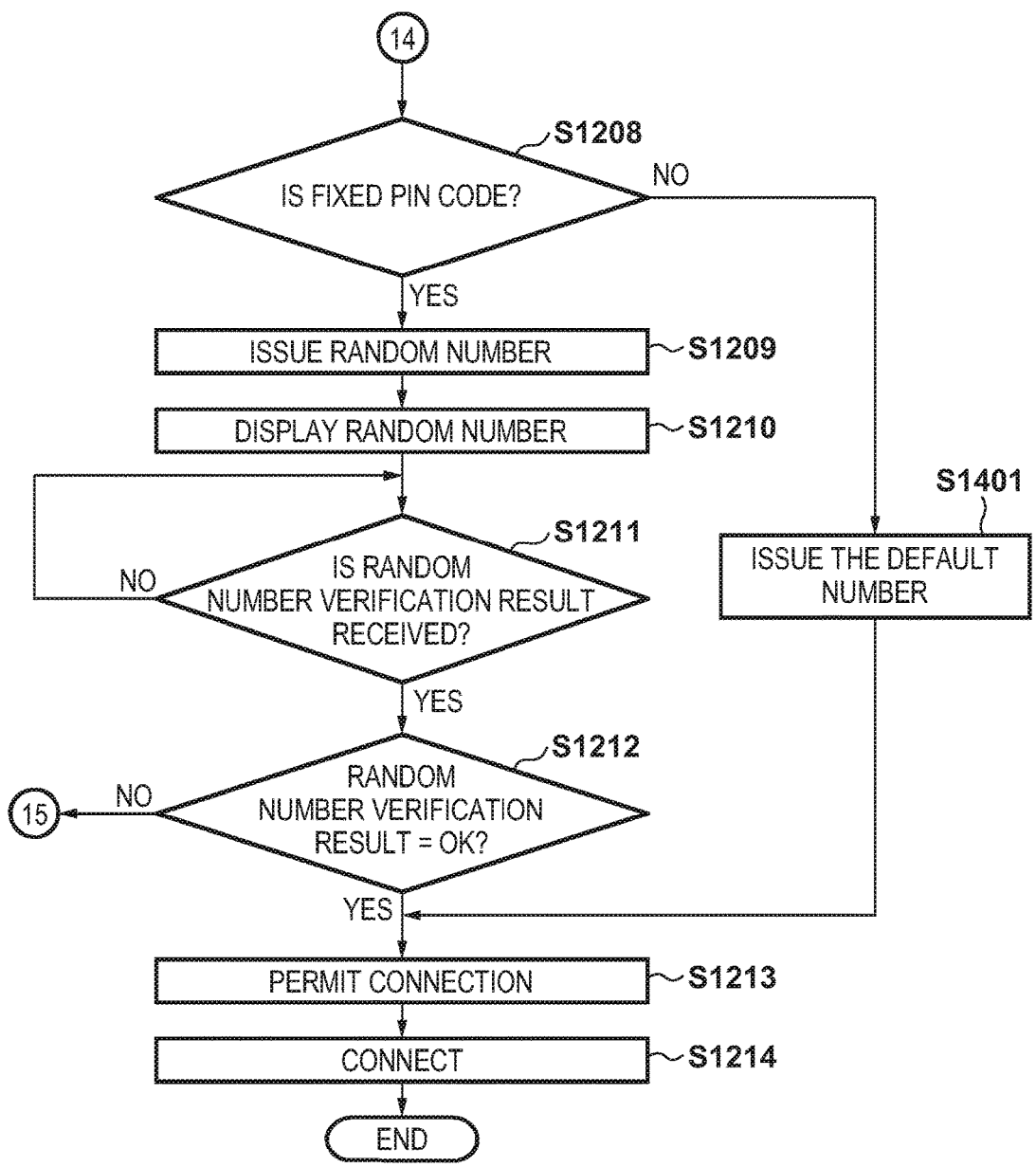

Firstly, the processing procedure of the multifunction peripheral 100 in a case when the initial connection request from the mobile terminal 21 is accepted will be described with reference to FIGS. 14A and 14B. The processing of the multifunction peripheral 100 which is described hereinafter is controlled by the control unit 200 in the multifunction peripheral 100. Specifically the processing explained below is realized by the CPU 205 reading a control program stored in the HDD 208 into the RAM 206 and executing it. Note, here, for control that is the same as the third embodiment described above explained in FIGS. 12A and 12B, the same step numbers are given and explanation is omitted. Specifically, because the processing of step S1201 through step S1214 is the same, explanation is omitted.

In step S1208, if it is determined that it is not the fixed PIN code, the processing proceeds to step S1401. In step S1401, the CPU 205 issues a default random number value (a default number), and stores the default random number value into the HDD 208. Note, if the CPU 205 issues the default number, it reads the default number defined in advance from the HDD 208. After that, the processing proceeds to step S1213.

Figure 15A:
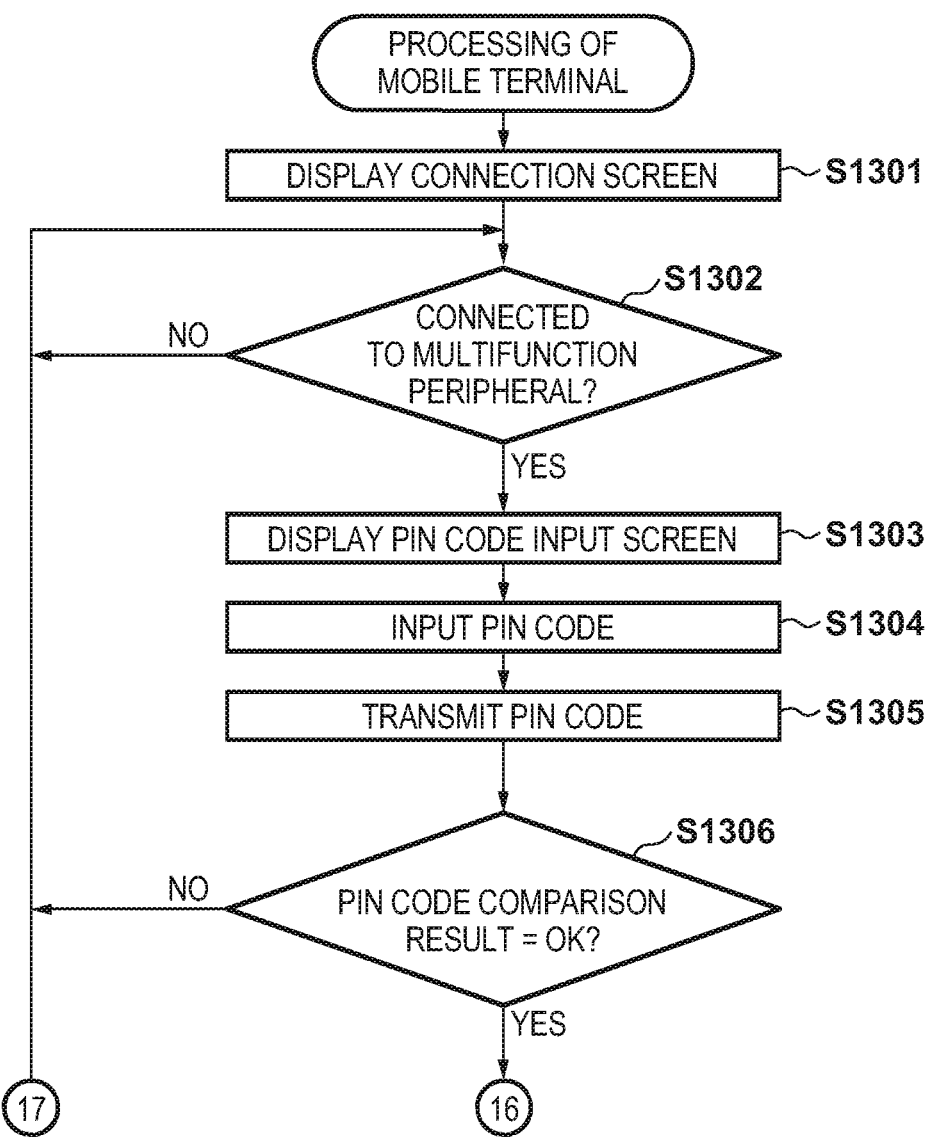

Next, the processing procedure of the mobile terminal 21 in the present embodiment will be described with reference to FIGS. 15A and 15B. Note that the processing of the mobile terminal 21 in the present specification is controlled by the control unit 20 in the mobile terminal 21. Specifically, the processing explained hereinafter is realized by the CPU 24 reading a control program stored in the internal memory 25 into the RAM 26 and executing it. Note, here, for control that is the same as the foregoing third embodiment explained in FIGS. 13A and 13B, the same step numbers are given and explanation is omitted. Specifically, because the processing of step S1301 through step S1306, and step S1308 through step S1314 is the same, the explanation is omitted. Note, the determination of step S1307 is deleted from the flowchart in FIG. 13B, and the determination of step S1501 is performed between step S1309 and step S1310.

Specifically, in step S1501, the CPU 24 determines whether or not the random number stored in the RAM 26 is the default random number value (default number). If the received random number value is determined to not be the default number, the processing proceeds to step S1310, otherwise the processing proceeds to step S1313. Note, the CPU 24 reads the random number value defined in advance (default number) from the RAM 26, and performs the determination described above by comparing with a receipt random number value (the RAM 26). Also, the random number value defined in advance (the RAM 26) is something for which the same value as the random number value (default number) stored in the HDD 208 of the multifunction peripheral 100 is stored.

As described above, the image processing apparatus according to the embodiment, in addition to control in the third embodiment described above, further issues a default random number value in the case of the one-time PIN code. On the other hand, the mobile terminal determines whether it is the default random number value if a random number is received, and if it is the default random number value, authentication using a random number is not performed, and if it is not the default random number value, the PIN code that is used is determined to be a fixed PIN code, and authentication using a random number is performed. In this control, a similar effect to the third embodiment described above can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-185515 filed on Sep. 18, 2015, and Japanese Patent Application No. 2016-008289 filed on Jan. 19, 2016, which are hereby incorporated by reference herein in their entirety.

What is claimed is:

1. An image processing apparatus with which an external terminal can communicate, the apparatus comprising:
a wireless communicator configured to receive, wirelessly, a connection request from the external terminal that requests the image processing apparatus to connect with the external terminal wirelessly;
a display;
a processor; and
a memory configured to store a program that causes the processor to:
set identification numbers of a predetermined number of digits corresponding to any one of at least a first setting that uses identification numbers which is registered in the image processing apparatus as the identification numbers to be set and a second setting that uses identification numbers which is obtained by a calculation by the image processing apparatus as the identification numbers to be set;
receive identification numbers same as the set identification numbers from the external terminal after the connection request is received from the external terminal; and
display, in a first case where the first setting has been selected, specific information different from the set identification numbers on each of the display of the image processing apparatus and a display of the external terminal, after receiving the identification numbers same as the set identification numbers from the external terminal, and not display, in a second case where the second setting has been selected, the specific information on each of the display of the image processing apparatus and the display of the external terminal, after receiving the identification numbers same as the set identification numbers from the external terminal.

2. The image processing apparatus according to claim 1, wherein
the processor disconnects a connection to the external terminal after transmitting public key of the image processing apparatus to the external terminal.

3. The image processing apparatus according to claim 1, wherein
the communication with the external terminal by the wireless communicator is Bluetooth communication.

4. The image processing apparatus according to claim 3, wherein
the identification numbers include a PIN code used in the Bluetooth communication.

5. The image processing apparatus according to claim 1, wherein the program causes the processor to:
display the set identification numbers on the display of the image processing apparatus; and
display the specific information different from the set identification numbers having been displayed on the display of the image processing apparatus on each of the display of the image processing apparatus and the display of the external terminal, after receiving the identification numbers same as the set identification numbers having been displayed on the display of the image processing apparatus from the external terminal.

6. The image processing apparatus according to claim 1, wherein the program causes the processor to:
generate random numbers; and
display the generated numbers as the specific information on each of the display of the image processing apparatus and a display of the external terminal, after receiving the identification numbers same as the set identification numbers from the external terminal.

7. The image processing apparatus according to claim 1, wherein the program causes the processor to:
transmit the specific information to the external terminal to display the specific information on the display of the external terminal after receiving the identification numbers same as the set identification numbers from the external terminal.

8. The image processing apparatus according to claim 1, wherein the program causes the processor to:
determine, based on a selection by an administrator of the image processing apparatus, to use any one of at least the first setting that uses identification numbers which is registered in the image processing apparatus as the identification numbers to be set and the second setting that uses identification numbers which is obtained by a calculation by the image processing apparatus.

9. The image processing apparatus according to claim 8, wherein the program causes the processor to:
control whether or not to display, after receiving the identification numbers same as the set identification numbers from the external terminal, the specific information on each of the display of the image processing apparatus and the display of the external terminal, based on the determination.

10. The image processing apparatus according to claim 9, wherein the program causes the processor to:
display the specific information on each of the display of the image processing apparatus and the display of the external terminal, after receiving the identification numbers same as the set identification numbers from the external terminal, if the first setting is determined to be used, and
not display the specific information on each of the display of the image processing apparatus and the display of the external terminal, after receiving the identification numbers same as the set identification numbers from the external terminal, if the second setting is determined to be used.

11. The image processing apparatus according to claim 8, wherein the identification numbers which is registered in the image processing apparatus is identification numbers which is fixed whether or not the connection request is received from the external terminal, and the identification numbers which is obtained by a calculation by the image processing apparatus is changed based on the receiving of the connection request from the external terminal.

12. An image processing apparatus with which an external terminal can communicate, the image processing apparatus comprising:
a wireless communicator configured to receive, wirelessly, a connection request from the external terminal that requests the image processing apparatus to connect with the external terminal wirelessly;
a display;
a processor;
a memory configured to store a program that causes the processor to:
set identification numbers of a predetermined number of digits;
receive identification numbers same as the set identification numbers from the external terminal after the connection request is received from the external terminal; and
display specific information different from the set identification numbers on each of the display of the image processing apparatus and a display of the external terminal after receiving the identification numbers same as the set identification numbers from the external terminal;
the image processing apparatus further comprising:
a user interface configured to set an authentication using the identification numbers to be valid or invalid, wherein
if the authentication using the identification numbers has been set to be invalid by the user interface,
the processor generates a random number of a second number of digits larger than a first number of digits of the identification numbers in place of the identification numbers, and
displays, on the display, the generated random number, and
transmits the random number to the external terminal, when accepting, as a response to the transmitted random number, confirmation information indicating that the external terminal has received the random number, generates a public key and a private key, and transmits the generated public key to the external terminal.

13. The image processing apparatus according to claim 12, wherein
the user interface is further configured to set a shortening function that shortens a connection time in the initial connection request to be valid or invalid,
if authentication using the identification numbers has been set to be invalid and the shortening function has been set to be valid by the user interface,
the processor generates a random number of the second number of digits larger than the first number of digits of the identification numbers in place of the identification numbers, and displays the generated random number on the display, and
the processor generates the public key and the private key, and
wherein the network interface transmits the random number displayed on the display and the generated public key to the external terminal.

14. The image processing apparatus according to claim 12, wherein the user interface further
sets, as a security mode in communication with the external terminal, a first mode or a second mode that strengthens security more than the first mode, and
the processor exchanges a Long Term Key with the external terminal when information corresponding to the identification numbers from the external terminal is accepted if the first mode is set by the user interface.

15. An image processing apparatus with which an external terminal can communicate, the image processing apparatus comprising:
a wireless communicator configured to receive, wirelessly, a connection request from the external terminal that requests the image processing apparatus to connect with the external terminal wirelessly;
a display;
a processor; and
a memory configured to store a program that causes the processor to:
set identification numbers of a predetermined number of digits;
receive identification numbers same as the set identification numbers from the external terminal after the connection request is received from the external terminal; and
display specific information different from the set identification numbers on each of the display of the image processing apparatus and a display of the external terminal after receiving the identification numbers same as the set identification numbers from the external terminal,
wherein
the processor generates challenge data to transmit to the external terminal based on a second or subsequent connection request received from the external terminal by the wireless communicator,
the wireless communicator transmits the generated challenge data to the external terminal,
the processor decrypts, with a private key, the challenge data and a common key which are received from the external terminal as a response to the transmitted challenge data, and
the processor performs encrypted communication using the common key received from the external terminal if the generated challenge data transmitted to the external terminal matches the challenge data received from the external terminal as the response.

16. A method of controlling an image processing apparatus with which an external terminal can communicate, the method comprising:
accepting, by a wireless communicator, a connection request from the external terminal that requests the image processing apparatus to connect with the external terminal wirelessly;
setting, by a processor, identification numbers of a predetermined number of digits corresponding to any one of at least a first setting that uses identification numbers which is registered in the image processing apparatus as the identification numbers to be set and a second setting that uses identification numbers which is obtained by a calculation by the image processing apparatus as the identification numbers to be set;
receiving identification numbers same as the set identification numbers from the external terminal after the connection request is received from the external terminal; and
displaying, in a first case where the first setting has been selected, specific information different from the set identification numbers on each of a display of the image processing apparatus and a display of the external terminal, after receiving the identification numbers same as the set identification numbers from the external terminal, and not displaying, in a second case where the second setting has been selected, the specific information on each of the display of the image processing apparatus and the display of the external terminal, after receiving the identification numbers same as the set identification numbers from the external terminal.

17. A non-transitory computer-readable storage medium storing a computer program for causing a computer to execute a method of controlling an image processing apparatus with which an external terminal can communicate, the method comprising:

accepting, by a wireless communicator, a connection request from the external terminal that requests the image processing apparatus to connect with the external terminal wirelessly;

setting, by a processor, identification numbers of a predetermined number of digits corresponding to any one of at least a first setting that uses identification numbers which is registered in the image processing apparatus as the identification numbers to be set and a second setting that uses identification numbers which is obtained by a calculation by the image processing apparatus as the identification numbers to be set;

receiving identification numbers same as the set identification numbers from the external terminal after the connection request is received from the external terminal; and displaying, in a first case where the first setting has been selected, specific information different from the set identification numbers on each of a display of the image processing apparatus and a display of the external terminal, after receiving the identification numbers same as the set identification numbers from the external terminal, and not displaying, in a second case where the second setting has been selected, the specific information on each of the display of the image processing apparatus and the display of the external terminal, after receiving the identification numbers same as the set identification numbers from the external terminal.

* * * * *